(12) United States Patent
Patel

(10) Patent No.: US 7,225,436 B1
(45) Date of Patent: *May 29, 2007

(54) JAVA HARDWARE ACCELERATOR USING MICROCODE ENGINE

(75) Inventor: Mukesh K. Patel, Fremont, CA (US)

(73) Assignee: Nazomi Communications Inc., Santa Clara, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 09/687,777

(22) Filed: Oct. 13, 2000

Related U.S. Application Data

(63) Continuation-in-part of application No. 09/208,741, filed on Dec. 8, 1998, now Pat. No. 6,332,215.
(60) Provisional application No. 60/239,298, filed on Oct. 10, 2000.

(51) Int. Cl.
*G06F 9/45* (2006.01)
*G06F 9/44* (2006.01)
*G06F 15/00*

(52) U.S. Cl. .................. 717/139; 717/118; 717/148; 712/41

(58) Field of Classification Search ......... 717/136–140, 717/118, 148, 131, 143, 116, 134–137, 139, 717/165, 190; 712/137, 202, 203, 210, 36, 712/229; 711/108, 1, 103
See application file for complete search history.

(56) References Cited

U.S. PATENT DOCUMENTS 3,889,243 A 6/1975 Drimak
4,236,204 A 11/1980 Groves
4,524,416 A 6/1985 Stanley et al.

(Continued)

OTHER PUBLICATIONS

Title: Fast, Effective Code Generation in a Just–in–time Java Compiler, author: Reza et al, ACM, May 1998.*
Title: A Software High Performane APL Interpreter, author: Saal et al, ACM, 1979.*
"SGI WebForce 02 is a one–stop Web authoring platform," InfoWorld, Jan. 20, 1997.
Krall, et al., "CACAO—A 64–bit Java VM just–in–time compiler," Concurrency: Practice and Experience, vol. 9 (11), pp. 1017–1030, Nov. 1997.
"Sun says JAVA chips will vastly increased speed, reduce costs to run JAVA programs," *Interactive Daily* (Dec. 1996) downloaded from the Internet.
Andreas Krall, "Efficient JAVA VM Just–In–Time Compilation," IEEE 1998.
Debaere and Campenhout, "Interpretation and Instruction Path Copressing," ©1990 The MIT Press.
C. John Glossner and Stamatis Vassiliadis, *The Delft–Java Engine: An Introduction*, Euro–Part '97, Parallel Processing, Third International Euro–Par Conference, pp. 766–770 (Aug. 1997).

(Continued)

*Primary Examiner*—Anthony Nguyen-Ba
(74) *Attorney, Agent, or Firm*—Hahn and Moodley LLP; Vani Moodley

(57) ABSTRACT

A hardware Java™ accelerator is comprised of a decode stage and a microcode stage. Separating into the decode and microcode stage allows the decode stage to implement instruction level parallelism while the microcode stage allows the conversion of a single Java™ bytecode into multiple native instructions. A reissue buffer is provided which stores the converted instructions and reissues them when the system returns from an interrupt. In this manner, the hardware accelerator need not be flushed upon an interrupt A native PC monitor is also used. While the native PC is within a specific range, the hardware accelerator is enabled to convert the Java™ bytecodes into native instructions. When the native PC is outside the range, the hardware accelerator is disabled and the CPU operates on native instructions obtained from the memory.

22 Claims, 19 Drawing Sheets

U.S. PATENT DOCUMENTS

| | | | |
|---|---|---|---|
| 4,587,612 A | 5/1986 | Fisk et al. | |
| 4,587,632 A | 5/1986 | Ditzel | |
| 4,631,663 A | 12/1986 | Chilinski et al. | |
| 4,763,255 A | 8/1988 | Hopkins et al. | |
| 4,783,738 A | 11/1988 | Li et al. | |
| 4,860,191 A | 8/1989 | Nomura et al. | |
| 4,922,414 A | 5/1990 | Holloway et al. | |
| 4,961,141 A | 10/1990 | Hopkins et al. | |
| 4,969,091 A | 11/1990 | Muller | |
| 5,077,657 A | 12/1991 | Cooper et al. | |
| 5,113,522 A | 5/1992 | Dinwiddie, Jr. et al. | |
| 5,136,696 A | 8/1992 | Beckwith et al. | |
| 5,142,681 A | 8/1992 | Driscoll et al. | |
| 5,163,139 A | 11/1992 | Haigh et al. | |
| 5,193,180 A | 3/1993 | Hastings | |
| 5,201,056 A | 4/1993 | Daniel et al. | |
| 5,218,711 A | 6/1993 | Yoshida | |
| 5,241,636 A | 8/1993 | Kohn | |
| 5,265,206 A | 11/1993 | Shackelford et al. | |
| 5,307,492 A | 4/1994 | Benson | |
| 5,313,614 A | 5/1994 | Goettelmann et al. | |
| 5,333,296 A | 7/1994 | Bouchard et al. | |
| 5,335,344 A | 8/1994 | Hastings | |
| 5,355,460 A | 10/1994 | Eickemeyer et al. | |
| 5,430,862 A | 7/1995 | Smith et al. | |
| 5,481,684 A | 1/1996 | Richter et al. | |
| 5,490,256 A | 2/1996 | Mooney et al. | |
| 5,535,329 A | 7/1996 | Hastings | |
| 5,542,059 A | 7/1996 | Blomgren | |
| 5,574,927 A | 11/1996 | Scantlin | |
| 5,577,233 A | 11/1996 | Goettelmann et al. | |
| 5,619,665 A | 4/1997 | Emma | |
| 5,619,666 A | 4/1997 | Coon et al. | |
| 5,634,118 A | 5/1997 | Blomgren | |
| 5,638,525 A | 6/1997 | Hammond et al. | |
| 5,650,948 A | 7/1997 | Gafter | |
| 5,659,703 A | 8/1997 | Moore et al. | |
| 5,668,999 A | 9/1997 | Gosling | |
| 5,692,170 A | 11/1997 | Isaman | |
| 5,740,441 A | 4/1998 | Yellin et al. | |
| 5,740,461 A | 4/1998 | Jaggar | |
| 5,748,964 A | 5/1998 | Gosling | |
| 5,752,035 A | 5/1998 | Trimberger | |
| 5,761,477 A | 6/1998 | Wahbe et al. | |
| 5,764,908 A | 6/1998 | Shoji et al. | |
| 5,768,593 A | 6/1998 | Walters et al. | |
| 5,774,868 A | 6/1998 | Cragun et al. | |
| 5,778,178 A | 7/1998 | Arunachalam | |
| 5,781,750 A | 7/1998 | Blomgren et al. | |
| 5,784,584 A | 7/1998 | Moore et al. | |
| 5,794,068 A | 8/1998 | Asghar et al. | |
| 5,805,895 A | 9/1998 | Breternitz, Jr. et al. | |
| 5,809,336 A | 9/1998 | Moore et al. | |
| 5,838,165 A | 11/1998 | Chatter | |
| 5,838,948 A | 11/1998 | Bunza | |
| 5,875,336 A * | 2/1999 | Dickol et al. | 717/143 |
| 5,889,996 A | 3/1999 | Adams | |
| 5,898,850 A * | 4/1999 | Dickol et al. | 712/229 |
| 5,898,885 A * | 4/1999 | Dickol et al. | 712/36 |
| 5,903,761 A | 5/1999 | Tyma | |
| 5,905,895 A | 5/1999 | Halter | |
| 5,920,720 A | 7/1999 | Toutonghi et al. | |
| 5,923,892 A | 7/1999 | Levy | |
| 5,925,123 A | 7/1999 | Tremblay et al. | |
| 5,926,832 A | 7/1999 | Wing et al. | |
| 5,937,193 A | 8/1999 | Evoy | |
| 5,940,858 A * | 8/1999 | Green | 711/139 |
| 5,946,487 A * | 8/1999 | Dangelo | 717/148 |
| 5,946,718 A * | 8/1999 | Green | 711/207 |
| 5,953,741 A | 9/1999 | Evoy et al. | |
| 5,983,334 A | 11/1999 | Coon et al. | |
| 5,999,731 A * | 12/1999 | Yellin et al. | 717/126 |
| 6,003,038 A | 12/1999 | Chen | |
| 6,009,499 A | 12/1999 | Koppala | |
| 6,014,723 A * | 1/2000 | Tremblay et al. | 711/1 |
| 6,021,469 A | 2/2000 | Tremblay et al. | |
| 6,026,485 A | 2/2000 | O'Connor et al. | |
| 6,031,992 A | 2/2000 | Cmelik et al. | |
| 6,038,643 A | 3/2000 | Tremblay et al. | |
| 6,052,526 A | 4/2000 | Chatt | |
| 6,065,108 A | 5/2000 | Tremblay et al. | |
| 6,067,577 A | 5/2000 | Beard | |
| 6,071,317 A | 6/2000 | Nagel | |
| 6,075,940 A | 6/2000 | Gosling | |
| 6,076,141 A * | 6/2000 | Tremblay et al. | 711/108 |
| 6,081,665 A | 6/2000 | Nilsen | |
| 6,108,768 A | 8/2000 | Koppala et al. | |
| 6,110,226 A | 8/2000 | Bothner | |
| 6,118,940 A | 9/2000 | Alexander, III et al. | |
| 6,125,439 A * | 9/2000 | Tremblay et al. | 712/202 |
| 6,131,144 A | 10/2000 | Koppala | |
| 6,131,191 A | 10/2000 | Cierniak et al. | |
| 6,139,199 A | 10/2000 | Rodriguez | |
| 6,141,794 A | 10/2000 | Dice et al. | |
| 6,158,048 A | 12/2000 | Lueh et al. | |
| 6,167,488 A | 12/2000 | Koppala | |
| 6,209,077 B1 | 3/2001 | Robertson et al. | |
| 6,233,678 B1 * | 5/2001 | Bala | 712/240 |
| 6,275,903 B1 | 8/2001 | Koppala et al. | |
| 6,292,883 B1 | 9/2001 | Augusteijn et al. | |
| 6,317,872 B1 | 11/2001 | Gee et al. | |
| 6,321,323 B1 | 11/2001 | Nugroho et al. | |
| 6,330,659 B1 | 11/2001 | Poff et al. | |
| 6,349,377 B1 | 2/2002 | Lindwer | |
| 6,374,286 B1 | 4/2002 | Gee et al. | |
| 6,477,702 B1 * | 11/2002 | Yellin et al. | 717/126 |
| 6,532,531 B1 | 3/2003 | O'Connor et al. | |
| 6,606,743 B1 * | 8/2003 | Raz et al. | 717/148 |

OTHER PUBLICATIONS

M.W. El–Kharashi et al., *Java Microprocessor: Computer Architecture Implications*, IEEE Pacific Rim Conference on Communications, Computers and Signal Processing, vol. 1, pp. 277–280 (Aug. 20–22, 1997).

R. Tomasulo, *An Efficient Algorithm for Exploring Multiple Arithmetic Units*, IBM Journal of Research and Development, vol. 11, No. 1, pp. 25–33 (Jan. 1967).

Andrews, et al., "Migrating a CISC computer family onto RISC via object code translation", *Proceedings of the Fifth International Conference on Architectural Support for Programming Languages and Operating Systems*, 1992, (1992).

Berekovic, et al., "Hardware Realization of a Java Virtual Machine for High Performance Multimedia Applications", *IEEE Workshop on Signal Processing Systems* 1997, (Jan. 1, 1997).

Deutsch, Peter, et al., "Efficient Implementation of the Smalltalk–80 System", *11th ACM SIGACT–SIGPLAN Symposium on Principles of Programming Languages*, 1984, (1984).

Ertl, "A new approach to forth native code generation", *EuroForth Conference Proceedings*, 1992, (1992).

Ertl, "Stack caching for interpreters", *SIGPLAN*, 1995, (1995).

Ertl, "Stack caching for interpreters", *EuroForth Conference Proceedings* 1994, (1994).

Glossner, et al., "Delft–Java Link Translation Buffer", *Proceedings of the 24th EUROMICRO conference, Aug. 1998*, (Aug. 1998).

Hsieh, et al., "Java Byte Code to Native Code Translation: The Caffeine Prototype and Preliminary Results", *IEEE*, (Jan. 1, 1996).

Kieburtz, "A RISC architecture for symbolic computation", *ACM 1987*, (1987).

Mahlke, et al., "A Comparsion of Full and Partial Predicted Execution Support for ILP Processors", *IEEE*, (Jan. 1, 1995).

Maierhofer, et al., "Optimizing stack code", *Forth–Tagung*, 1997, (1997).

McGhan, et al., "picoJava: A Direct Execution Engine for Java Bytecode", *IEEE*, 1998, (1998).

Miyoshi, et al., "Implementation and Eveluation of Real Time Java Threads", *IEEE*, (Jan. 1, 1997).

Ertl, "Implementation of stack–based languages on register machines", *dissertation*, Apr. 1996, (Apr. 1996).

O'Connor, et al., "picoJava–I: The Java Virtual Machine in Hardware", *IEEE, Mar.* 1997, (Mar. 1997).

Rose, A C., "Hardware Java Accelerator for the ARM 7$^{th}$ " *4th Year Undergraduate Project in Group D*, (1996/97), 1–49, Appendix.

Steensgarrd, et al., "Object and Native Code Thread Mobilty Among Heterogeneous Computers", *ACM*, (Jan. 1, 1995).

Sun Microsystems, "PicoJava 1 Microprocessor Core Architecture", *Oct. 1996*, (Oct. 1996).

Sun Microsystems, "PicoJava I, Java Processor Core Data Sheet", *Dec. 1997*, (Dec. 1997).

Unger, et al., "Architecture of SOAR: Smalltalk on a RISC", *11th Symposium on Computer Architecture Jun. 1984*, (Jun. 1, 1984).

Rose, A C., "Hardware Java Accelerator for the ARM 7", *4th Year Undergraduate Project in Group D*, (1996/97), 1–49, Appendix.

Steinbusch, Otto , "Designing Hardware to Interpret Virtual Machine Instructions", *Dept. of Electrical Engineering, Eindhoven University of Technology, Master Degree Thesis, Feb. 1998*, 59.

\* cited by examiner

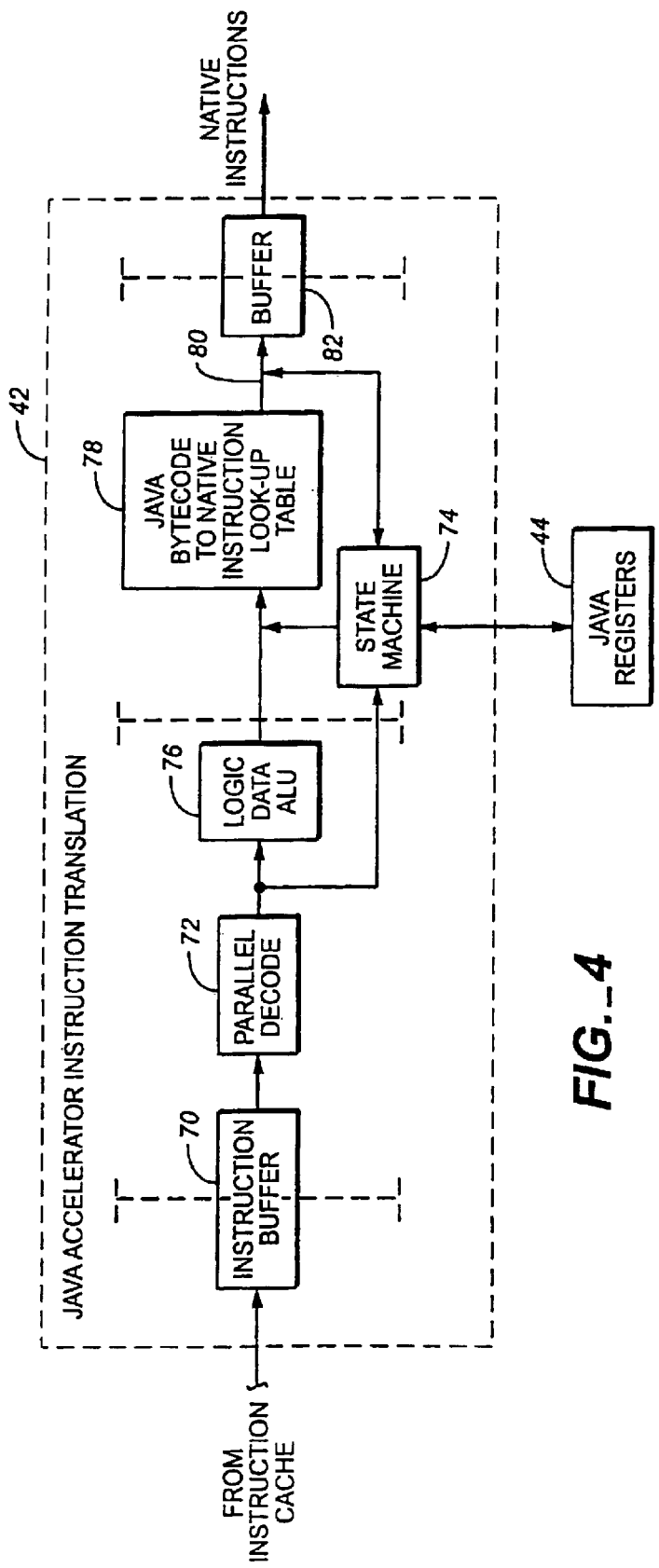
FIG._4

I. INSTRUCTION TRANSLATION

| JAVA BYTECODE | ⇨ | NATIVE INSTRUCTION |
|---|---|---|
| iadd | | ADD R1, R2 |

II. JAVA REGISTER

```
PC = VALUE A                    PC = VALUE A + 1
OPTOP = VALUE B        ⇨        OPTOP = VALUE B - 1
        (R1)                            (R2)
VAR = VALUE C                   VAR = VALUE C
```

III. JAVA CPU REGISTER FILE

```
                         R0  0001                          NOT A VALID    R0  0001
CONTAINS VALUE  →  R1  0150                          STACK VALUE  →  R1  0150
    OF TOP OF        R2  1210       ⇨         CONTAINS VALUE  →  R2  1360
  OPERAND STACK      R3  0007                       OF THE TOP OF     R3  0007
                         R4  0005                          OPERAND STACK     R4  0005
                         R5  0006                                                R5  0006
CONTAINS FIRST  →  R6  1221                                                R6  1221
     VARIABLE          R7  1361                                                R7  1361
```

IV. MEMORY

```
OPTOP = VALUE B  → -  0150                                      -  0150
      (VALUE B - 1) -  1210         ⇨        OPTOP = VALUE B - 1 -  1360
                   -  0007                                      -  0007
                   -  0005                                      -  0005
                   -  0006                                      -  0006
                   -  0001                                      -  0001
                   -  4427                                      -  4427

VAR = VALUE C  -  1221                       VAR = VALUE C  -  1221
                   -  1361                                      -  1361
                   -  1101                                      -  1101
```

FIG._5

I. INSTRUCTION TRANSLATION

| JAVA BYTECODE | | NATIVE INSTRUCTION |
|---|---|---|
| iload_n<br>iadd | ⇨ | ADD R6, R1 |

II. JAVA REGISTER

| | | |
|---|---|---|
| PC = VALUE A<br>OPTOP = VALUE B<br>(R1)<br>VAR = VALUE C | ⇨ | PC = VALUE A + 2<br>OPTOP = VALUE B<br>(R1)<br>VAR = VALUE C |

III. JAVA CPU REGISTER FILE

|  |  |  |
|---|---|---|
| CONTAINS → R1 0150<br>VALUE OF R2 1210<br>TOP OF<br>OPERAND STACK R3 0007<br>R4 0005<br>R5 0006<br>CONTAINS FIRST → R6 1221<br>VARIABLE R7 1361<br>R0 0001 | ⇨ | R0 0001<br>CONTAINS → R1 1371<br>VALUE OF R2 1210<br>TOP OF<br>STACK R3 0007<br>R4 0005<br>R5 0006<br>CONTAINS → R6 1221<br>FIRST R7 1361<br>VARIABLE |

IV. MEMORY

*FIG._6*

| Opcodes Mnemonic | Opcode xHH | Excep Gen |
|---|---|---|
| nop | 0x00 | |
| aconst_null | x01 | |
| iconst_m1 | x02 | |
| iconst_n(0-5) | x03 - x08 | |
| lconst_n(0-1) | x09 - x0a | |
| fconst_n(0-2) | x0c - x0d | |
| dconst_n(0-1) | x0e - x0f | |
| bipush | x10 | |
| sipush | x11 | |
| ldc | x12 | y |
| ldc_w | x13 | y |
| ldc2_w | x14 | y |
| iload | x15 | |
| lload | x16 | |
| fload | x17 | |
| dload | x18 | |
| aload | x19 | |
| iload_n(0-3) | x1a - x1d | |
| lload_n(0-3) | x1e - x21 | |
| fload_n(0-3) | x22 - x25 | |
| dload_n(0-3) | x26 - x29 | |
| aload_n(0-3) | x2a - x2d | |
| iaload | x2e | |
| laload | x2f | |
| faload | x30 | |
| daload | x31 | |
| aaload | x32 | |
| baload | x33 | |
| caload | x34 | |
| saload | x35 | |
| istore | x36 | |
| lstore | x37 | |
| fstore | x38 | |
| dstroe | x39 | |
| astroe | x3a | |
| istore_n(0-3) | x3b - x3e | |
| lstore_n(0-3) | x3f - x42 | |
| fstore_n(0-3) | x43 - x46 | |
| dstore_n(0-3) | x47 - x4a | |
| astore_n(0-3) | x4b - x4e | |
| iastore | x4f | |
| lastore | x50 | |
| fastroe | x51 | |
| dastore | x52 | |
| bastore | x53 | |
| aastore | x54 | |
| castroe | x55 | |
| sastore | x56 | |

FIG._7A

| pop | x57 | |
| --- | --- | --- |
| pop2 | x58 | |
| dup | x59 | |
| dup_x1 | x5a | |
| dup_x2 | x5b | |
| dup2 | x5c | |
| dup2_x1 | x5d | |
| dup2_x2 | x5e | |
| swap | x5f | |
| iadd | x60 | |
| ladd | x61 | |
| fadd | x62 | y |
| dadd | x63 | y |
| isub | x64 | |
| lsub | x65 | |
| fsub | x66 | y |
| dsub | x67 | y |
| imul | x68 | |
| lmul | x69 | |
| fmul | x6a | y |
| dmul | x6b | y |
| idiv | x6c | y |
| ldiv | x6d | y |
| fdiv | x6e | y |
| ddiv | x6f | y |
| irem | x70 | y |
| lrem | x71 | y |
| frem | x72 | y |
| drem | x73 | y |
| ineg | x74 | |
| lneg | x75 | |
| fneg | x76 | y |
| dneg | x77 | y |
| ishl | x78 | |
| lshl | x79 | |
| ishr | x7a | |
| lshr | x7b | |
| iushr | x7c | |
| lushr | x7d | |
| iand | x7e | |
| land | x7f | |
| ior | x80 | |
| lor | x81 | |
| ixor | x82 | |
| lxor | x83 | |
| iinc | x84 | |
| i2l | x85 | y |
| i2f | x86 | y |
| i2d | x87 | y |
| l2i | x88 | y |
| l2f | x89 | y |
| l2d | x8a | y |

FIG._7B

| | | |
|---|---|---|
| f2i | x8b | y |
| f2l | x8c | y |
| f2d | x8d | y |
| d2i | x8e | y |
| d2l | x8f | y |
| d2f | x90 | y |
| i2b | x91 | |
| i2c | x92 | |
| i2s | x93 | |
| lcmp | x94 | y |
| fcmpl | x95 | y |
| fcmpg | x96 | y |
| dcmpl | x97 | y |
| dcmpg | x98 | y |
| ifeq | x99 | |
| ifne | x9a | |
| iflt | x9b | |
| ifge | x9c | |
| ifgt | x9d | |
| ifle | x9e | |
| if_icmpeq | x9f | |
| if_icmpne | xa0 | |
| if_icmplt | xa1 | |
| if_acmpge | xa2 | |
| if_cmpgt | xa3 | |
| if_icmple | xa4 | |
| if_acmpeq | xa5 | |
| if_acmpne | xa6 | |
| goto | xa7 | |
| jsr | xa8 | |
| ret | xa9 | |
| tableswitch | xaa | y |
| lookupswitch | xab | y |
| ireturn | xac | |
| lreturn | xad | |
| freturn | xae | |
| dreturn | xaf | |
| areturn | xb0 | |
| return | xb1 | |
| getstatic | xb2 | y |
| putstatic | xb3 | y |
| getfield | xb4 | y |
| putfield | xb5 | y |
| invokevirtual | xb6 | y |
| invokespecial | xb7 | y |
| invokestatic | xb8 | y |
| invokeinterface | xb9 | y |
| xxunsedxxx | xba | y |
| new | xbb | y |
| newarray | xbc | y |
| anewarray | xbd | y |
| arraylength | xbe | y |

FIG. _7C

| | | |
|---|---|---|
| athrow | xbf | y |
| checkcast | xc0 | y |
| instanceof | xc1 | y |
| monitorenter | xc2 | y |
| monitorexit | xc3 | y |
| wide | xc4 | y |
| multianewarray | xc5 | y |
| ifnull | xc6 | y |
| ifnonnull | xc7 | y |
| goto_w | xc8 | |
| jsr_w | xc9 | |
| | | |
| ... | | |
| ldc_quick | xcb | y |
| ldc_w_quick | xcc | y |
| ldc2_w_quick | xcd | y |
| getfield_quick | xce | y |
| putfield_quick | xcf | y |
| getfield2_quick | xd0 | y |
| putfield2_quick | xd1 | y |
| getstatic_quick | xd2 | y |
| putstatic_quick | xd3 | y |
| gtestatic2_quick | xd4 | y |
| putstatic2_quick | xd5 | y |
| invokevirtual_quick | xd6 | y |
| invokenonvirtual_quick | xd7 | y |
| invokesuper_quick | xd8 | y |
| invokestatic_quick | xd9 | y |
| invokeinterface_quick | xda | y |
| invokevirtualobject_quick | xdb | y |
| new_quick | xdc | y |
| anewarray_quick | xde | y |
| multinewarray_quick | xdf | y |
| checkcast_quick | xe0 | y |
| instanceof_quick | xe1 | y |
| invokevirtual_quick_w | xe2 | y |
| getfield_quick_w | xe3 | y |
| putfield_quick_w | xe4 | y |
| | | |
| | | |
| breakpoint | xca | y |
| impdep1 | xfe | y |
| impdep2 | xff | y |

FIG._7D

JAVA HARDWARE ACCELERATOR USING MICROCODE ENGINE

RELATED APPLICATIONS

The present application is a continuation-in-part of the application entitled "Java Virtual Machine Hardware for RISC and CISC Processors," filed Dec. 8, 1998, now U.S. Pat. No. 6,332,215 inventor Mukesh K. Patel, et al., U.S. Application Ser. No. 09/208,741. The present application also claims priority to a provisional application 60/239,298 filed Oct. 10, 2000 entitled "Java Hardware Accelerator Using Microcode Engine".

BACKGROUND OF THE INVENTION

Java™ is an object-orientated programming language developed by Sun Microsystems. The Java language is small, simple and portable across platforms and operating systems, both at the source and at the binary level. This makes the Java programming language very popular on the Internet.

Java's platform independence and code compaction are the most significant advantages of Java over conventional programming languages. In conventional programming languages, the source code of a program is sent to a compiler which translates the program into machine code or processor.

Java™ operates differently. The Java™ compiler takes a Java™ program and, instead of generating machine code for a particular processor, generates bytecodes. Bytecodes are instructions that look like machine code, but aren't specific to any processor. To execute a Java™ program, a bytecode interpreter takes the Java™ bytecode converts them to equivalent native processor instructions and executes the Java™ program. The Java™ bytecode interpreter is one component of the Java™ Virtual Machine.

Having the Java™ programs in bytecode form means that instead of being specific to any one system, the programs can run on any platform and any operating system as long a Java™ Virtual Machine is available. This allows a binary bytecode file to be executable across platforms.

The disadvantage of using bytecodes is execution speed. System specific programs that run directly on the hardware from which they are compiled, run significantly faster that Java™ bytecodes, which must be processed by the Java™ Virtual Machine. The processor must both convert the Java™ bytecodes into native instructions in the Java™ Virtual Machine and execute the native instructions.

One way to speed up the Java™ Virtual Machine is by techniques such as the "Just in Time" (JIT) interpreter, and even faster interpreters known as "Hot Spot JITs" interpreters. The JIT versions all result in a JIT compile overhead to generate native processor instructions. These JIT interpreters also result in additional memory overhead.

The slow execution speed of Java™ and overhead of JIT interpreters have made it difficult for consumer appliances requiring local-cost solutions with minimal memory usage and low energy consumption to run Java™ programs. The performance requirements for existing processors using the fastest JITs more than double to support running the Java™ Virtual Machine in software. The processor performance requirements could be met by employing superscalar processor architectures or by increasing the processor clock frequency. In both cases, the power requirements are dramatically increased. The memory bloat that results from JIT techniques, also goes against the consumer application requirements of low cost and low power.

It is desired to have an improved system for implementing Java™ programs that provides a low-cost solution for running Java™ programs for consumer appliances.

SUMMARY OF THE INVENTION

The present invention generally relates to Java™ hardware accelerators used to translate Java™ bytecodes into native instructions for a central processing unit (CPU). One embodiment of the present invention comprises a reissue buffer, the reissue buffer associated with a hardware accelerator and adapted to store converted native instructions issued to the CPU along with associated native program counter values. When the CPU returns from an interrupt the reissue buffer examines the program counter to determine whether to reissue a stored native instruction value from the reissue buffer. In this way, returns from interrupts can be efficiently handled without reloading the hardware accelerator with the instructions to convert.

Another embodiment of the present invention comprises a hardware accelerator to convert stacked-base instructions into register-based instructions native to a central processing unit. The hardware accelerator includes a native program counter monitor. The native program counter monitor checks whether the native program counter is within a hardware accelerator program counter range. When the hardware accelerator program counter is within the hardware accelerator program counter range, the hardware accelerator is enabled and converted native instructions are sent to the CPU from the hardware accelerator, the native program counter is not used to determine instructions to load from memory.

In this manner, the hardware accelerator can spoof the native program counter to be within a certain range which corresponds to the program counter range in which the stacked-base instructions are stored. By monitoring the program counter, the hardware accelerator can always tell when it needs to be operating and needs to not operate. Thus if a interrupt occurs, causing the data program counter to move to a range outside of the hardware accelerator program counter range, there need be no explicit instruction to the hardware accelerator from the CPU handling the interrupt to stall the hardware accelerator.

Yet another embodiment of the present invention comprises a hardware accelerator operably connected to a central processing unit, the hardware accelerator adapted to convert stack-based instructions into register-based instructions native to the central processing unit. The hardware accelerator includes a microcode stage. The microcode stage includes microcode memory. The microcode memory output includes a number of fields, the fields including a first set of fields corresponding to native instruction fields and a control bit field which affects the interpretation of the first set of fields by the microcode controlled logic to produce a native instruction. Use of a microcode portion allows the same general hardware accelerator architecture to work with a variety of central processing units. In a preferred embodiment, the microcode portion is separate from a decode portion.

BRIEF DESCRIPTION OF THE DRAWINGS

The present invention may be further understood from the following description in conjunction with the drawings.

FIG. 4 is a diagram illustrating the details of one embodiment of a Java™ accelerator instruction translation in the system of the parent invention.

FIG. 5 is a diagram illustration the instruction translation operation of one embodiment of the parent invention.

FIG. 6 is a diagram illustrating the instruction translation system of one embodiment of the parent invention using instruction level parallelism.

FIGS. 7A–D are the table of exception bytecodes for one embodiment of the parent invention.

DETAILED DESCRIPTION OF THE PREFERRED EMBODIMENTS

FIGS. 1–7D illustrate the operation of the parent application.

Figure 1:
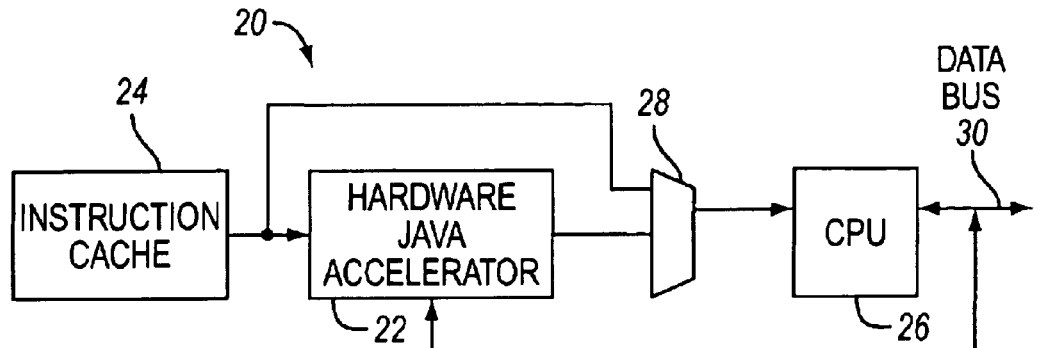
FIG. 1 is a diagram of the system of the parent invention including a hardware Java™ accelerator.

FIG. 1 is a diagram of the system 20 showing the use of a hardware Java™ accelerator 22 in conjunction with a central processing unit 26. The Java™ hardware accelerator 22 allows part of the Java™ Virtual Machine to be implemented in hardware. This hardware implementation speeds up the processing of the Java™ bytecodes. In particular, in a preferred embodiment, the translation of the Java™ bytecodes into native processor instructions is at least partially done in the hardware Java™ accelerator 22. This translation has been part of a bottleneck in the Java™ Virtual Machine when implemented in software. In FIG. 1, instructions from the instruction cache 24 or other memory is supplied to the hardware Java™ accelerator 22. If these instruction are Java™ bytecode, the hardware Java™ accelerator 22 can convert these bytecodes into native processor instruction which are supplied through the multiplexer 28 to the CPU. If a non-Java™ code is used, the hardware accelerator can be by-passed using the multiplexer 26. The Java™ stack includes the frame, the operand stack, the variables, etc.

The Java™ hardware accelerator can do some or all of the following tasks:
1. Java™ bytecode decode;
2. identifying and encoding instruction level parallelism (ILP), wherever possible;
3. translating bytecodes to native instructions;
4. managing the Java™ stack on a register file associated with the CPU or as a separate stack;
5. generating exceptions on instructions on predetermined Java™ bytecodes;
6. switching to native CPU operation when native CPU code is provided;
7. performing bounds checking on array instructions; and
8. managing the variables on the register file associated with the CPU.

In a preferred embodiment, the Java™ Virtual Machine functions of bytecode interpreter, Java™ register, and Java™ stack are implemented in the hardware Java™ accelerator. The garbage collection heap and constant pool area can be maintained in normal memory and accessed through normal memory referencing. In one embodiment, these functions are accelerated in hardware, e.g. write barrier.

The major advantages of the Java™ hardware accelerator is to increase the speed in which the Java™ Virtual Machine operates, and allow existing native language legacy applications, software base, and development tools to be used. A dedicated microprocessor in which the Java™ bytecodes were the native instructions would not have access to those legacy applications.

Although the Java™ hardware accelerator is shown in FIG. 1 as separate from the central processing unit, the Java™ hardware accelerator can be incorporated into a central processing unit. In that case, the central processing unit has a Java™ hardware accelerator subunit to translate Java™ bytecode into the native instructions operated on by the main portion of the CPU.

Figure 2:
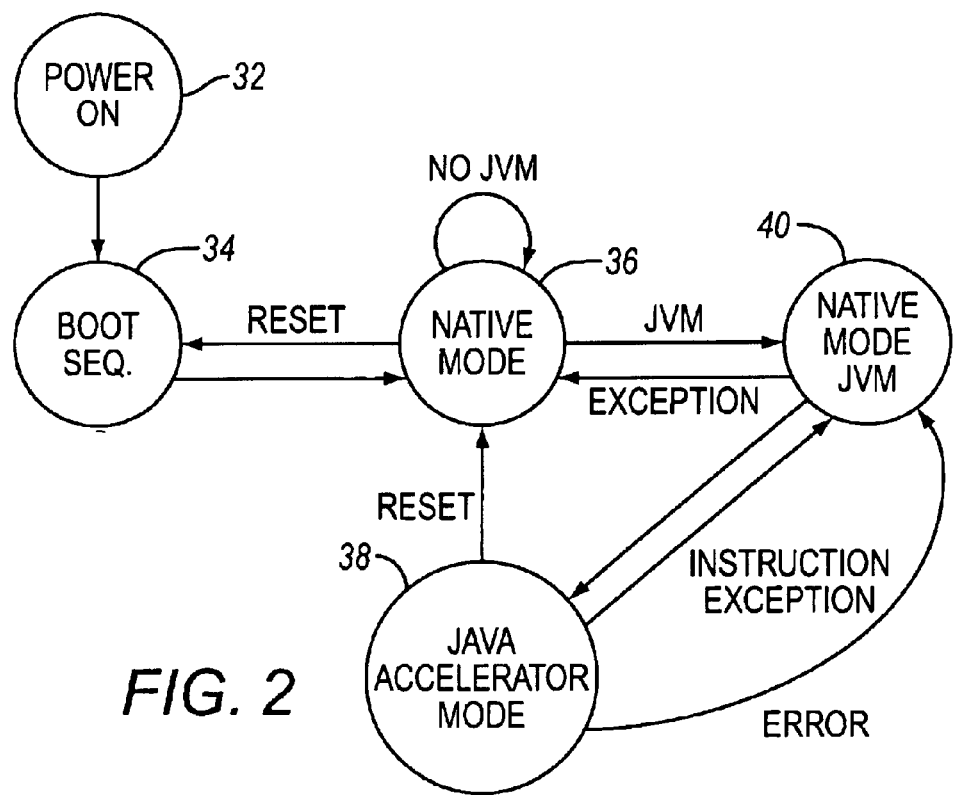
FIG. 2 is a diagram illustrating the use of the hardware Java™ accelerator of the parent invention.

FIG. 2 is a state machine diagram that shows the operation of one embodiment of the parent invention. Block 32 is the power-on state. During power-on, the multiplexer 28 is set to bypass the Java™ hardware accelerator. In block 34, the native instruction boot-up sequence is run. Block 36 shows the system in the native mode executing native instructions and by-passing the Java™ hardware accelerator.

In block 38, the system switches to the Java™ hardware accelerator mode. In the Java™ hardware accelerator mode, Java™ bytecode is transferred to the Java™ hardware accelerator 22, converted into native instructions then sent to the CPU for operation.

The Java™ accelerator mode can produce exceptions at certain Java™ bytecodes. These bytecodes are not processed by the hardware accelerator 22 but are processed in the CPU 26. As shown in block 40, the system operates in the native mode but the Java™ Virtual Machine is implemented in the accelerator which does the bytecode translation and handles the exception created in the Java™ accelerator mode.

The longer and more complicated bytecodes that are difficult to handle in hardware can be selected to produce the exceptions. FIGS. 7A-D is a table showing one possible list of bytecodes which can cause exceptions in a preferred embodiment.

Figure 3:
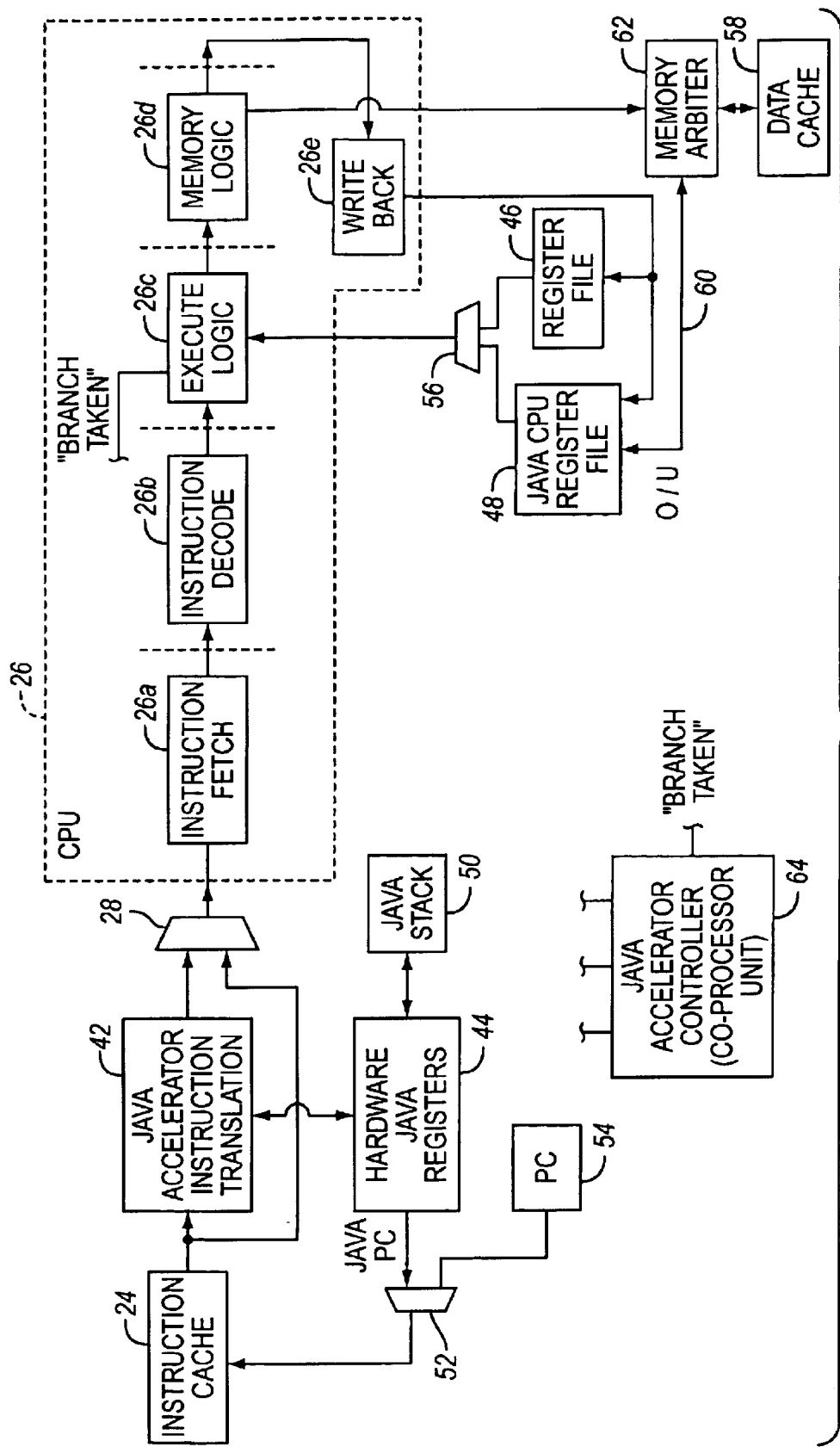
FIG. 3 is a diagram illustrating some the details of a Java™ hardware accelerator of one embodiment of the parent invention.

FIG. 3 is a diagram illustrating details of one embodiment of the Java™ hardware accelerator of the parent invention. The Java™ hardware accelerator includes Java™ accelerator instruction translation hardware 42. The instruction translation Unit 42 is used to convert Java™ bytecodes to native instructions. One embodiment of the Java™ accelerator instruction translation hardware 42 is described in more detail below with respect to FIG. 4. This instruction translation hardware 42 uses data stored in hardware Java™ registers 44. The hardware Java™ Registers store the Java™ Registers defined in the Java™ Virtual Machine. The Java™ Registers contain the state the Java™ Virtual Machine, affect its operation, and are updated at runtime. The Java™ registers in the Java™ virtual machine include the PC, the program counter indicating what bytecode is being executed; Optop, a pointer to the top of the operand stack; Frame, a pointer to the execution environment of the current method; and Java™ variables (Vars), a pointer to the first local variable available of the currently executing method. The virtual machine defines these registers to be a single 32-bit word wide. The Java™ registers are also stored in the Java™ stack which can be implemented as the hardware Java™ stack 50 or the Java™ stack can be stored into the CPU associated register file.

In a preferred embodiment, the hardware Java™ registers 44 can include additional registers for the use of the instruction translation hardware 42. These registers can include a register indicating a switch to native instructions configuration and control registers and a register indicating the version number of the system.

The Java™ PC can be used to obtain bytecode instructions from the instruction cache 24 or memory. In one embodiment the Java™ PC is multiplexed with the normal program counter 54 of the central processing unit 26 in multiplexer 52. The normal PC 54 is not used during the operation of the Java™ hardware bytecode translation. In another embodiment, the normal program counter 54 is used as the Java™ program counter.

The Java™ registers are a part of the Java™ Virtual Machine and should not be confused with the general registers 46 or 48 which are operated upon by the central processing unit 26. In one embodiment, the system uses the traditional CPU register file 46 as well as a Java™ CPU register file 48. When native code is being operated upon the multiplexer 56 connects the conventional register file 46 to the execution logic 26c of the CPU 26. When the Java™ hardware accelerator is active, the Java™ CPU register file 48 substitutes for the conventional CPU register file 46. In another embodiment, the conventional CPU register file 46 is used.

As described below with respect to FIGS. 3 and 4, the Java™ CPU register file 48, or in an alternate embodiment the conventional CPU register file 46, can be used to store portions of the operand stack and some of the variables. In this way, the native register-based instructions from the Java™ accelerator instruction translator 42 can operate upon the operand stack and variable values stored in the Java™ CPU register file 48, or the values stored in the conventional CPU register file 46. Data can be written in and out of the Java™ CPU register file 48 from the data cache or other memory 58 through the overflow/underflow line 60 connected to the memory arbiter 62 as well as issued load/store instructions. The overflow/underflow transfer of data to and from the memory can be done concurrently with the CPU operation. Alternately, the overflow/underflow transfer can be done explicitly while the CPU is not operating. The overflow/underflow bus 60 can be implemented as a tri-state bus or as two separate buses to read data in and write data out of the register file when the Java™ stack overflows or underflows.

The register files for the CPU could alternately be implemented as a single register file with native instructions used to manipulate the loading of operand stack and variable values to and from memory. Alternately, multiple Java™ CPU register files could be used: one register file for variable values, another register file for the operand stack values, and another register file for the Java™ frame stack holding the method environment information.

The Java™ accelerator controller (co-processing unit) 64 can be used to control the hardware Java™ accelerator, read in and out from the hardware Java™ registers 44 and Java™ stack 50, and flush the Java™ accelerator instruction translation pipeline upon a "branch taken" signal from the CPU execute logic 26c.

The CPU 26 is divided into pipeline stages including the instruction fetch 26a, instruction decode 26b, execute logic 26c, memory access logic 26d, and writeback logic 26e. The execute logic 26c executes the native instructions and thus can determine whether a branch instruction is taken and issue the "branch taken" signal. In one embodiment, the execute logic 26c monitors addresses for detecting branches.

FIG. 4 illustrates an embodiment of a Java™ accelerator instruction translator which can be used with the parent invention. The instruction buffer 70 stores the bytecode instructions from the instruction cache. The bytecodes are sent to a parallel decode unit 72 which decodes multiple bytecodes at the same time. Multiple bytecodes are processed concurrently in order to allow for instruction level parallelism. That is, multiple bytecodes may be converted into a lesser number of native instructions.

The decoded bytecodes are sent to a state machine unit 74 and Arithmetic Logic Unit (ALU) 76. The ALU 76 is provided to rearrange the bytecode instructions to make them easier to be operated on by the state machine 74 and perform various arithmetic functions including computing memory references. The state machine 74 converts the bytecodes into native instructions using the lookup table 78. Thus, the state machine 74 provides an address which indicates the location of the desired native instruction in the microcode look-up table 78. Counters are maintained to keep a count of how many entries have been placed on the operand stack, as well as to keep track of and update the top of the operand stack in memory and in the register file. In a preferred embodiment, the output of the microcode look-up table 78 is augmented with indications of the registers to be operated on in the native CPU register file at line 80. The register indications are from the counters and interpreted from bytecodes. To accomplish this, it is necessary to have a hardware indication of which operands and variables are in which entries in the register file. Native Instructions are composed on this basis. Alternately, these register indications can be sent directly to the Java™ CPU register file 48 shown in FIG. 3.

The state machine 74 has access to the Java™ registers in 44 as well as an indication of the arrangement of the stack and variables in the Java™ CPU register file 48 or in the conventional CPU register file 46. The buffer 82 supplies the translated native instructions to the CPU.

The operation of the Java™ hardware accelerator of one embodiment of the parent invention is illustrated in FIGS. 5 and 6. FIG. 5, section I shows the instruction translation of the Java™ bytecode. The Java™ bytecode corresponding to the mnemonic iadd is interpreted by the Java™ virtual machine as an integer operation taking the top two values of the operand stack, adding them together and pushing the result on top of the operand stack. The Java™ translating machine translates the Java™ bytecode into a native instruction such as the instruction ADD R1, R2. This is an instruction native to the CPU indicating the adding of value in register R1 to the value in register R2 and the storing of this result in register R2. R1 and R2 are the top two entries in the operand stack.

As shown in FIG. 5, section II, the Java™ register includes a PC value of "Value A" that is incremented to "Value A+1". The Optop value changes from "Value B" to "Value B−1" to indicate that the top of the operand stack is at a new location. The Vars base value which points to the start of the variable list is not modified. In FIG. 5, section m, the contents of a native CPU register file or a Java™ CPU register file, 48 in FIG. 3, is shown. The Java™ CPU register file starts off with registers R0–R5 containing operand stack values and registers R6–R7 containing variable values. Before the operation of the native instruction, register R1 contains the top value of the operand stack. Register R6 contains the first variable. Hardware is used to detect the availability of the Vars in the register file. If the Var is not available, the hardware in conjunction with microcode issue load instructions to the native CPU. Once the value of a Var has been updated in the RF, that entry is marked as being modified so when doing method calls, only the updated Vars in memory are written back to memory. This results in significantly higher performance methods. After the execution of the native instruction, register R2 now contains the top value of the operand stack. Register R1 no longer contains a valid operand stack value and is available to be overwritten by a operand stack value.

FIG. 5, section IV, shows the memory locations of the operand stack and variables which can be stored in the data cache 58 or in main memory. For convenience, the memory is illustrated without illustrating any virtual memory scheme. Before the native instruction executes, the address of the top of the operand stack, Optop, is "Value B". After the native instruction executes, the address of the top of the operand stack is "Value B−1" containing the result of the native instruction. Note that the operand stack value "4427" can be written into register R1 across the overflow/underflow line 60. Upon a switch back to the native mode, the data in the Java™ CPU register file 48 should be written to the data memory.

Consistency must be maintained between the Hardware Java™ Registers 44, the Java™ CPU register file 48 and the data memory. The CPU 26 and Java™ Accelerator Instruction Translation Unit 42 are pipelined and any changes to the hardware java registers 44 and changes to the control information for the Java™ CPU register file 48 must be able to be undone upon a "branch taken" signal. The system preferably uses buffers (not shown) to ensure this consistency. Additionally, the Java™ instruction translation must be done so as to avoid pipeline hazards in the instruction translation unit and CPU.

FIG. 6 is a diagram illustrating the operation of instruction level parallelism with the parent invention. In FIG. 6 the Java™ bytecodes iload_n and iadd are converted by the Java™ bytecode translator to the single native instruction ADD R6, R1. In the Java™ Virtual Machine, iload_n pushes the top local variable indicated by the Java™ register Var onto the operand stack.

In the parent invention the Java™ hardware translator can combine the iload_n and iadd bytecode into a single native instruction. As shown in FIG. 6, section II, the Java™ Register, PC, is updated from "Value A" to "Value A+2". The Optop value remains "value B". The value Var remains at "value C".

As shown in FIG. 6, section m, after the native instruction ADD R6, R1 executes the value of the first local variable stored in register R6, "1221", is added to the value of the top of the operand stack contained in register R1 and the result stored in register R1. In FIG. 6, section IV, the Optop value does not change but the value in the top of the register contains the result of the ADD instruction, 1371. This example shows the present invention operating with a native CPU supporting only two operands. The invention can also support three operands and Very Long Instruction Word (VLIW) CPU's.

For some byte codes such as SiPush, BiPush, etc., the present invention makes available sign extended data for the immediate field of the native instruction being composed (120) by the hardware and microcode. This data can alternatively be read as a coprocessor register. The coprocessor register read/write instruction can be issued by hardware accelerator as outlined in the present invention. Additionally, the microcode has several fields that aid in composing the native instruction.

The Java™ hardware accelerator of the parent invention is particularly well suited to a embedded solution in which the hardware accelerator is positioned on the same chip as the existing CPU design. This allows the prior existing software base and development tools for legacy applications to be used. In addition, the architecture of the present embodiment is scalable to fit a variety of applications ranging from smart cards to desktop solutions. This scalability is implemented in the Java™ accelerator instruction translation unit of FIG. 4. For example, the lookup table 78 and state machine 74 can be modified for a variety of different CPU architectures. These CPU architectures include reduced instruction set computer (RISC) architectures as well as complex instruction set computer (CISC) architectures. The present invention can also be used with superscalar CPUs or very long instruction word (VLIW) computers.

Figure 8:
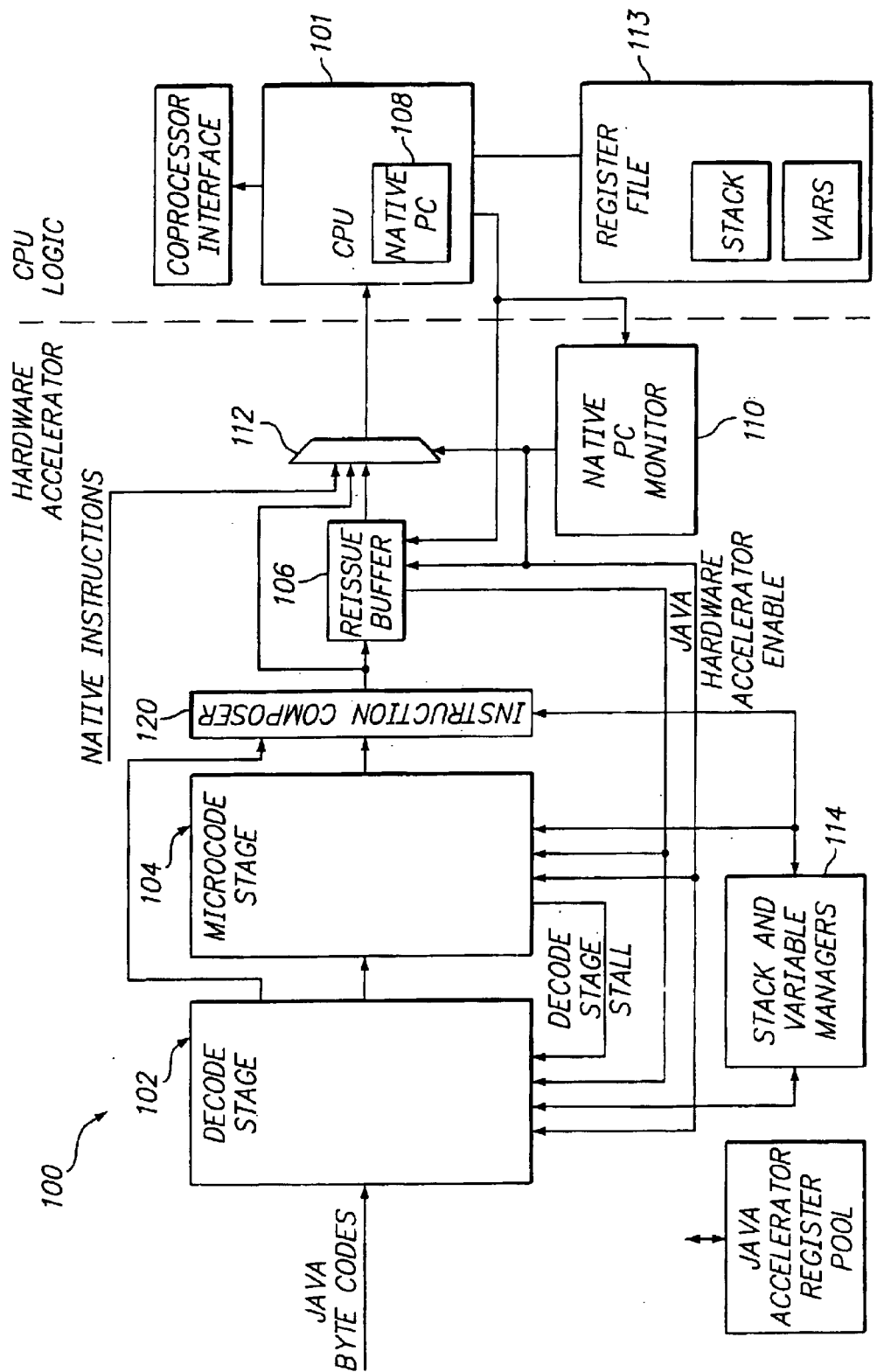
FIG. 8 is a diagram of one embodiment of a hardware accelerator used with one embodiment of the present invention.

FIGS. 8–20 illustrate the operation of the present invention. FIG. 8 is a diagram that shows a system 100 of one embodiment of the present invention. The system includes a CPU 101 and a hardware accelerator. The hardware accelerator portion includes a decode stage 102 for receiving the Java™ bytecode from the memory. Decode stage 102 preferably uses instruction level parallelism in which more than one Java™ bytecode can be converted into a single native instruction. In a preferred embodiment, the system 100 includes a microcode stage 104 which receives signals from the decode stage 102 and is used to construct the native instructions. The microcode stage 104 allows for the production of multiple native instructions from a single bytecode. The reissue buffer 106 stores a copy of the converted instructions in the reissue buffer 106 as they are sent to the CPU 101.

The reissue buffer 106 monitors the native PC value 110. In a preferred embodiment, when the hardware accelerator is active, the hardware accelerator does not use the native PC value to determine the memory location to load the instructions from memory. The native PC value is instead maintained within a spoofed range which indicates that the hardware accelerator is active. In a preferred embodiment, the native PC monitor 110 detects whether the native PC value is within the spoofed range. If so, the multiplexer 112 sends the converted instructions from the hardware accelerator to the CPU 101. If not, the native instructions from memory are loaded to the CPU 101. When in the spoofed range, the addresses sourced to memory are the Java™ PC from the accelerator. Otherwise the native PC is sourced to memory.

If an interrupt occurs, the native PC value will go to a value outside the spoofed range. The PC monitor 110 will then stall the hardware accelerator. When a return from interrupt occurs, the CPU 101 will be flushed, and upon return from interrupt, the native PC value 108 returned to the PC value prior to the interrupt. The reissue buffer 106 will then reissue stored native instructions flushed from CPU 101 to the CPU 101 that corresponds to this prior native PC value. With the use of this system, the hardware accelerator does not need to be flushed upon an interrupt, nor do previously converted Java™ bytecodes need to be reloaded into the hardware accelerator. The use of the reissue buffer 106 can thus speed the operation and recovery from interrupt.

The CPU 101 is associated with a register file 113. This register file is the native CPU's normal register file, operably connected to the CPU's ALU but is shown separately here for illustration. The register file 113 stores Stack and Var values which can be used by the converted instructions. The Stack- and Variable-managers 114 keep track of any information stored in the register file 113 and use it to help the microcode stage operations. As described below, in one embodiment there are a fixed number of registers used for Stack values and Variable value. For example, six registers can be used for the top six Stack values and six registers used for six Variable values.

In another embodiment of the present invention, the Stack and Variable manager assigns Stack and Variable values to different registers in the register file. An advantage of this alternate embodiment is that in some cases the Stack and Var values may switch due to an Invoke Call and such a switch can be more efficiently done in the Stack and Var manager 114 rather than producing a number of native instructions to implement this.

In one embodiment a number of important values can be stored in the hardware accelerator to aid in the operation of the system. These values stored in the hardware accelerator help improve the operation of the system, especially when the register files of the CPU are used to store portions of the Java™ stack.

The hardware accelerator preferably stores an indication of the top of the stack value. This top of the stack value aids in the loading of stack values from the memory. The top of the stack value is updated as instructions are converted from stack-based instructions to register-based instructions. When instruction level parallelism is used, each stack-bases instruction which is part of a single register-based instruction needs to be evaluated for its effects on the Java™ stack.

In one embodiment, an operand stack depth value is maintained in the hardware accelerator. This operand stack depth indicates the dynamic depth of the operand stack in the CPU's register files. Thus, if four stack values are stored in the register files, the stack depth indicator will read "4." Knowing the depth of the stack in the register file helps in the loading and storing of stack values in and out of the register files.

In a preferred embodiment, a minimum stack depth value and a maximum stack depth value are maintained within the hardware accelerator. The stack depth value is compared to the maximum and minimum stack depths. When the stack value goes below the minimum value, the hardware accelerator composes load instructions to load stack values from the memory into the register file of the CPU. When the stack depth goes above the maximum value, the hardware accelerator composes store instructions to store stack values back out to the memory.

In one embodiment, at least the top four (4) entries of the operand stack in the CPU register file operated as a ring buffer, the ring buffer maintained in the accelerator and operably connected to a overflow/underflow unit.

The hardware accelerator also preferably stores an indication of the operands and variables stored in the register file of the CPU. These indications allow the hardware accelerator to compose the converted register-based instructions from the incoming stack-based instructions.

The hardware accelerator also preferably stores an indication of the variable base and operand base in the memory. This allows for the composing of instructions to load and store variables and operands between the register file of the CPU and the memory. For example, When a Var is not available in the register file, the hardware issues load instructions. The hardware adapted to multiply the Var number by four and adding the Var base to produce the memory location of the Var. The instruction produced is based on knowledge that the Var base is in a temporary native CPU register. The Var number times four can be made available as the immediate field of the native instruction being composed, which may be a memory access instruction with the address being the content of the temporary register holding a pointer to the Vars base plus an immediate offset. Alternatively, the final memory location of the Var may be read by the CPU as an instruction saved by the accelerator and then the Var can be loaded.

In one embodiment, the hardware accelerator marks the variables as modified when updated by the execution of Java™ byte codes. The hardware accelerator can copy variables marked as modified to the system memory for some bytecodes.

In one embodiment, the hardware accelerator composes native instructions wherein the native instructions operands contains at least two native CPU register file references where the register file contents are the data for the operand stack and variables.

Figure 9:
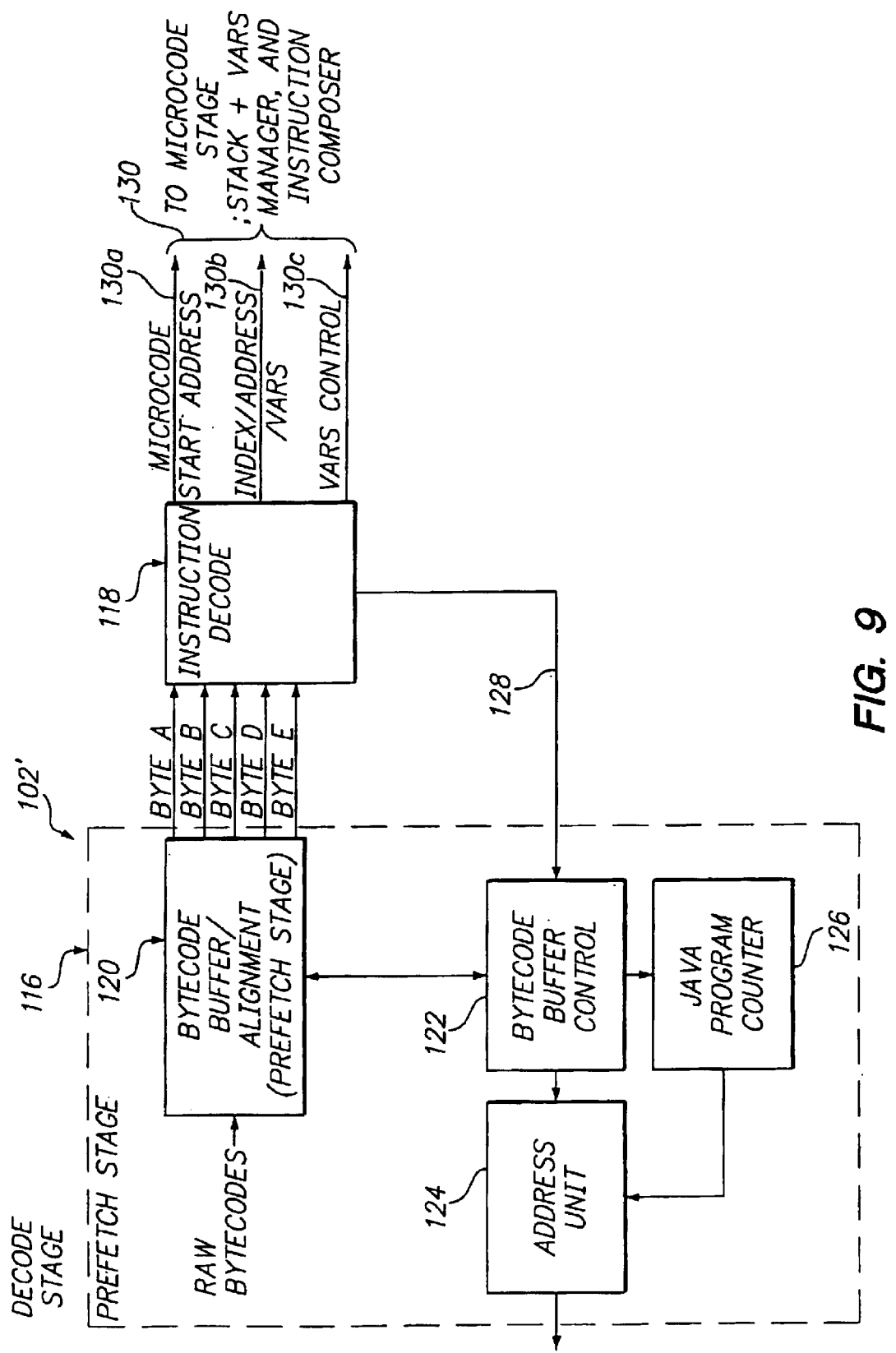
FIG. 9 is a diagram that illustrates the decode stage for use in the hardware accelerator of the present invention.

FIG. 9 illustrates a decode stage of one embodiment of the present invention. This decode stage 102' is divided into the prefetch stage 116 and the instruction decode 118. The prefetch stage 116 includes a bytecode buffer and alignment prefetch stage unit 120 which receives the raw bytecodes from a memory (not shown). The Java™ bytecode buffer control element 122 provides instructions to determine when to load additional bytecodes from the memory. The address unit 124 uses the Java™ program counter 126 to determine the location of the next bytecode to load. As described above, while the hardware accelerator is active, the Java™ program counter is used to get the next word from memory containing Java™ bytecode. The native PC is maintained within a spoofed region and is not used to get the next instruction while the hardware accelerator is active. The bytecode buffer alignment unit 120 contains a number of bytecodes from the memory. When the instructions are passed on from the instruction decode unit 118, a number of bytes are removed from the bytecode buffer alignment unit 120. A signal on line 128 indicates the number of bytecodes which are used by the instruction decode unit 118. In one embodiment, the decoded data on line 130 is sent to the microcode stage. This data can include the microcode Start Address data 130*a*, Index/Address and Vars data 130*b*, and Var Control data 130*c*.

Figure 10:
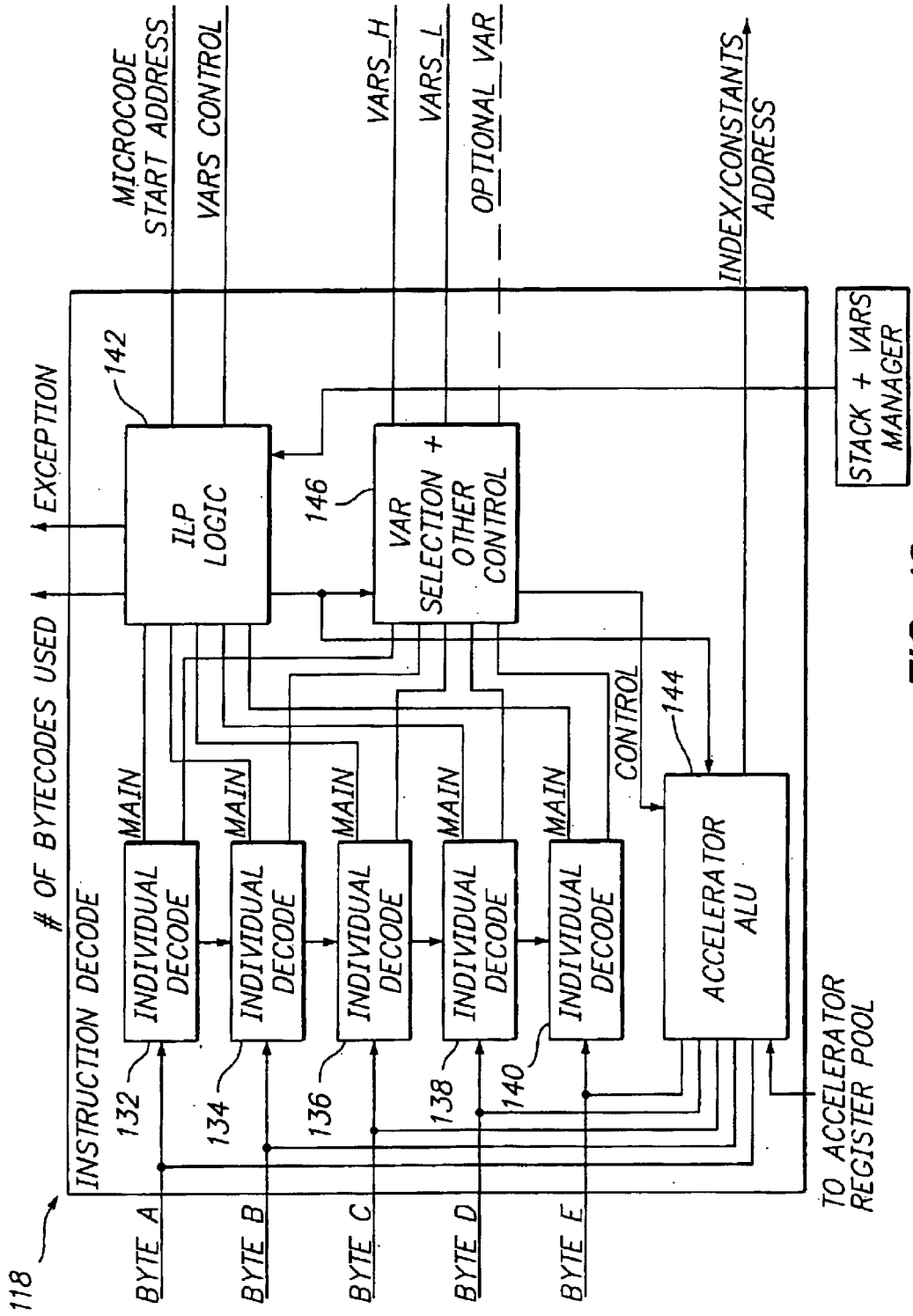
FIG. 10 is a diagram that illustrates one embodiment of an instruction decode unit used with the decode stage of FIG. 9.

FIG. 10 shows an instruction decode unit 118'. In this embodiment, a number of bytes are sent to an Instruction Decode unit. Individual Decode units 132, 134, 136, 138 and 140 receive and decode the bytes. Note that the value of adjacent bytes affects how the byte is decoded. For example, if byte A is the start of a two-byte instruction, the value of byte B is interpreted as the second half of the two-byte instruction. The instruction level parallelism logic 142 receives the decoded information and then determines the microcode start address for the primary bytecode. Secondary byte codes can be combined with the primary bytecode by the selection of registers accessed by the converted instruction. One example of this embodiment is described below with respect to FIGS. 19 and 20.

The accelerator ALU 144 is used to calculate index addresses and the like. The accelerator ALU is connected to the register pool. The use of the accelerator ALU allows certain simple calculations to be moved from the CPU unit to the hardware accelerator unit, and thus allows the Java™ bytecodes to be converted into fewer native instructions. The Variable Selection+Other Control unit 146 determines which registers are used as Vars. The Var control line from the ILP Logic unit 142 indicates how these Vars are interpreted. A Var and associated Var control line can be made available for each operand field in the native CPU's instruction.

In one embodiment, the hardware accelerator issues native load instructions when a variable is not present in the native CPU register file, the memory address being computed by the ALU in the hardware accelerator.

Figure 11:
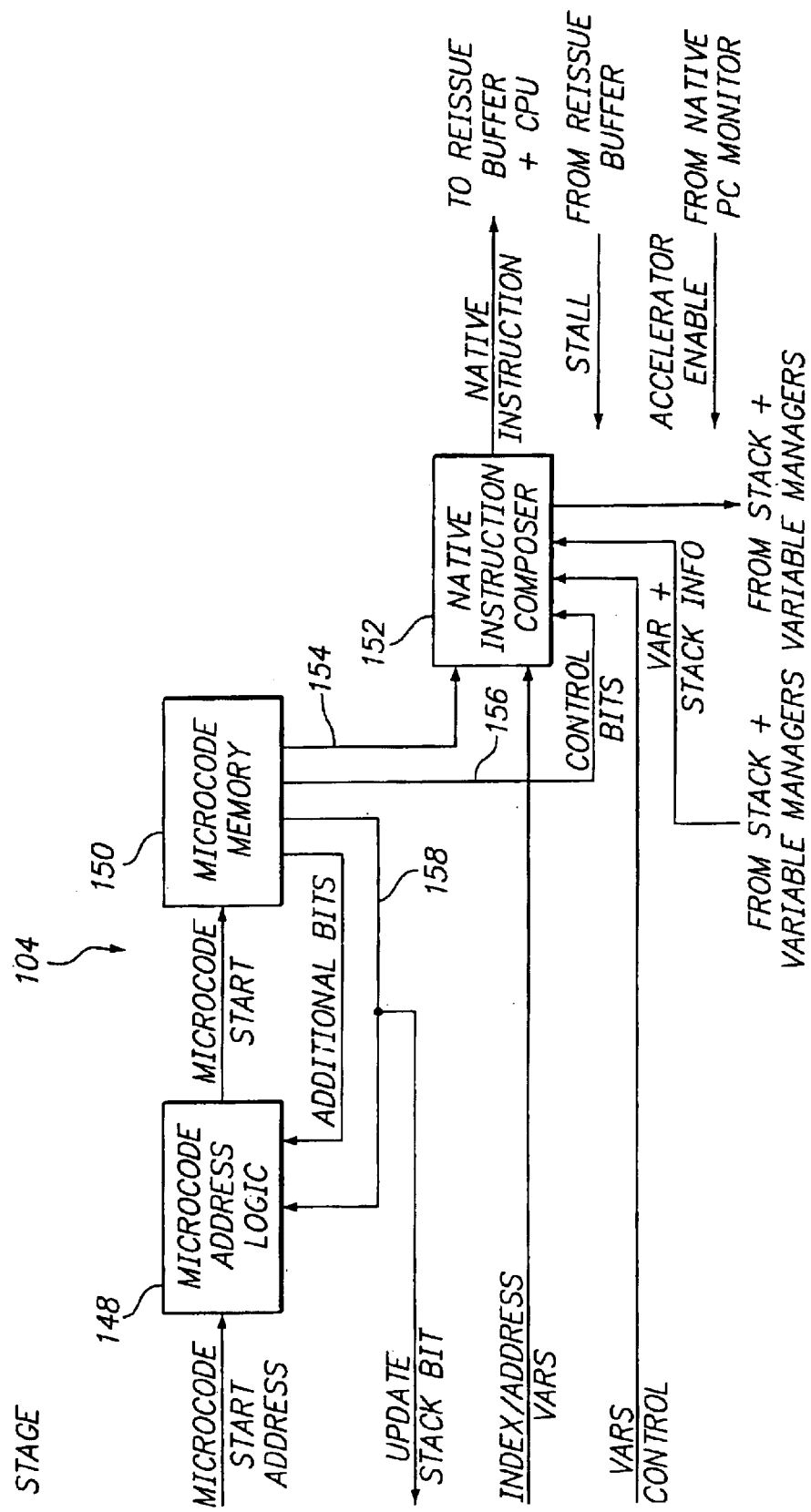
FIG. 11 is a diagram that illustrates one embodiment of a microcode stage for use with the embodiment of FIG. 8.

The microcode stage 104' shown in FIG. 11 includes a microcode address logic 148 and microcode memory 150. The microcode address logic sends microcode addresses to the microcode memory 150. The microcode memory 150 then sends the contents of that address to the Native Instruction Composer Logic 152 which produces the native instruction. Each microcode memory line includes a main instruction portion on line 154, control bits on line 156 and update stack pointer bits on line 158. Both the microcode address logic 148 and the microcode 150 can produce a string of native instructions until the update stack Bit is sent to the microcode address logic 148. At that point, the microcode address logic obtains another start address from the decode logic (not shown). The native instruction composer receives the main instruction portion on line 154, the control bits from the decode, the index address, Vars, and the Var controls. These inputs allow the native instruction composer 152 to construct the native instructions which are sent to the reissue buffer and the native CPU.

Figure 12:
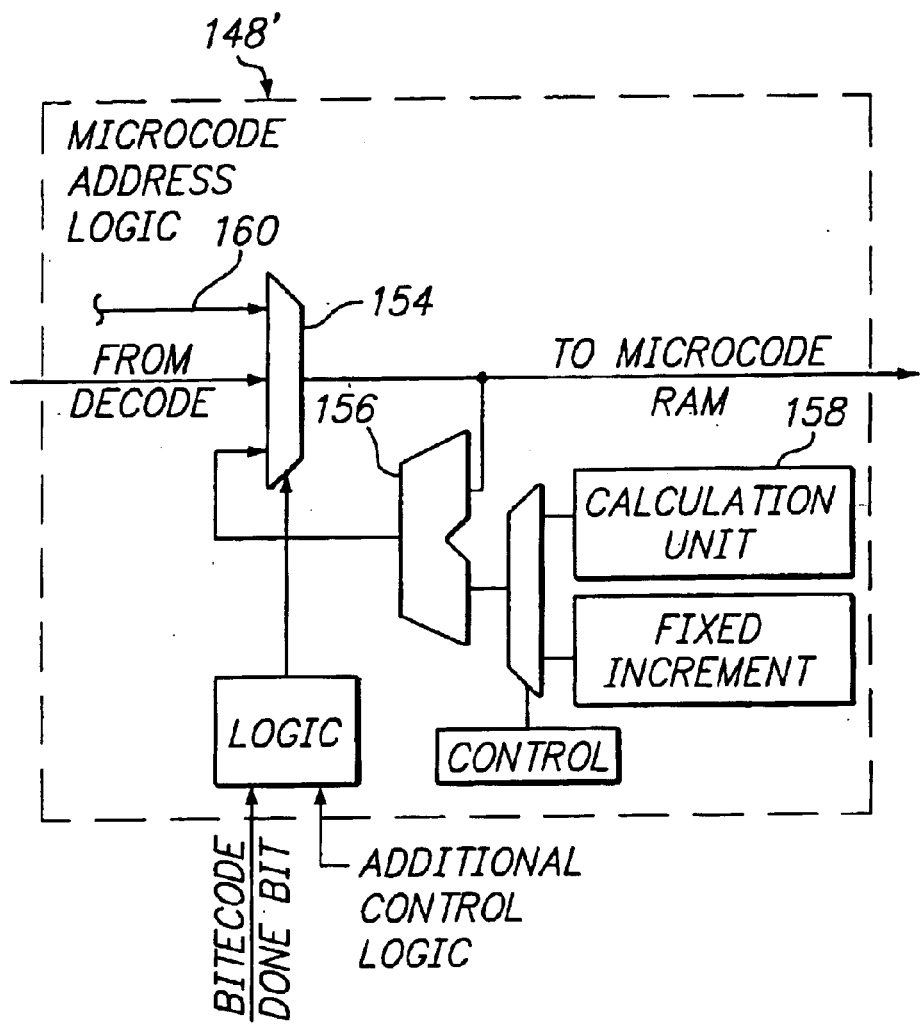
FIG. 12 is a diagram of a microcode address logic used with the microcode stage of FIG. 11.

FIG. 12 shows a microcode address logic 148' of one embodiment of the present invention. Start address coming from the decode logic goes to multiplexer 154. The multiplexer 154 can either send the start address or an incremental or calculated value to the microcode RAM. In a preferred embodiment, while the update stack bit is not set, the address of the next element in the microcode is calculated by the ALU 156 and provided to the multiplexer 154 for sending to the microcode memory (not shown). Space in the microcode RAM memory can be conserved by including jumps to other areas of the microcode memory. These jumps can be done by calculation in unit 158 or by providing the address on line 160.

Figure 13:
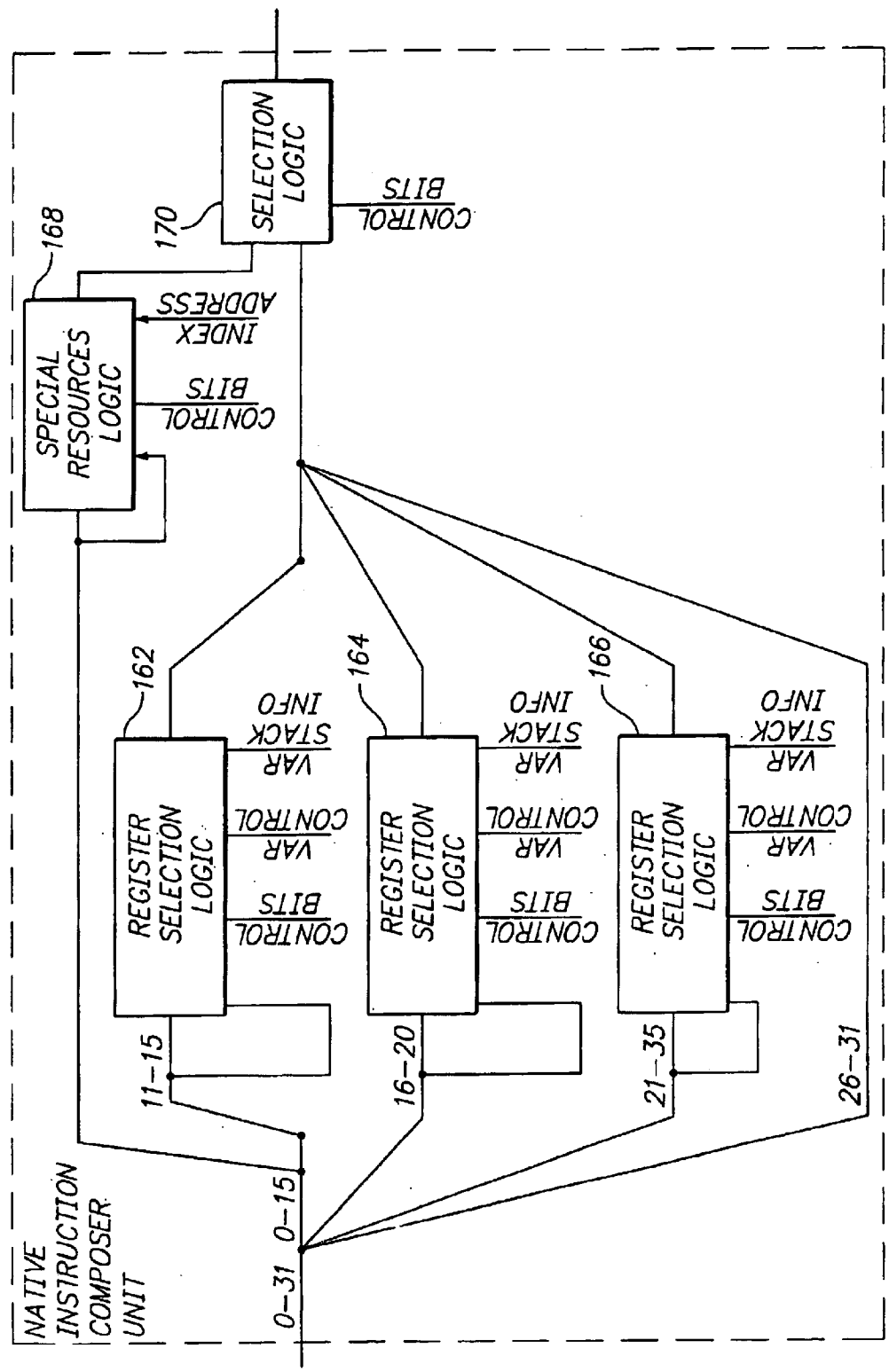
FIG. 13 is a diagram of a native instruction composer unit used with the embodiment of FIG. 11.

FIG. 13 illustrates an embodiment of a native instruction composer unit for use with the present invention. In this embodiment a number of register selection logic units 162, 164 and 166 are provided. Each register selection logic unit can be used to select a register used with a native instruction. Special resources logic unit 168 and selection logic 170 allow the selection of special instructions.

Figure 14:
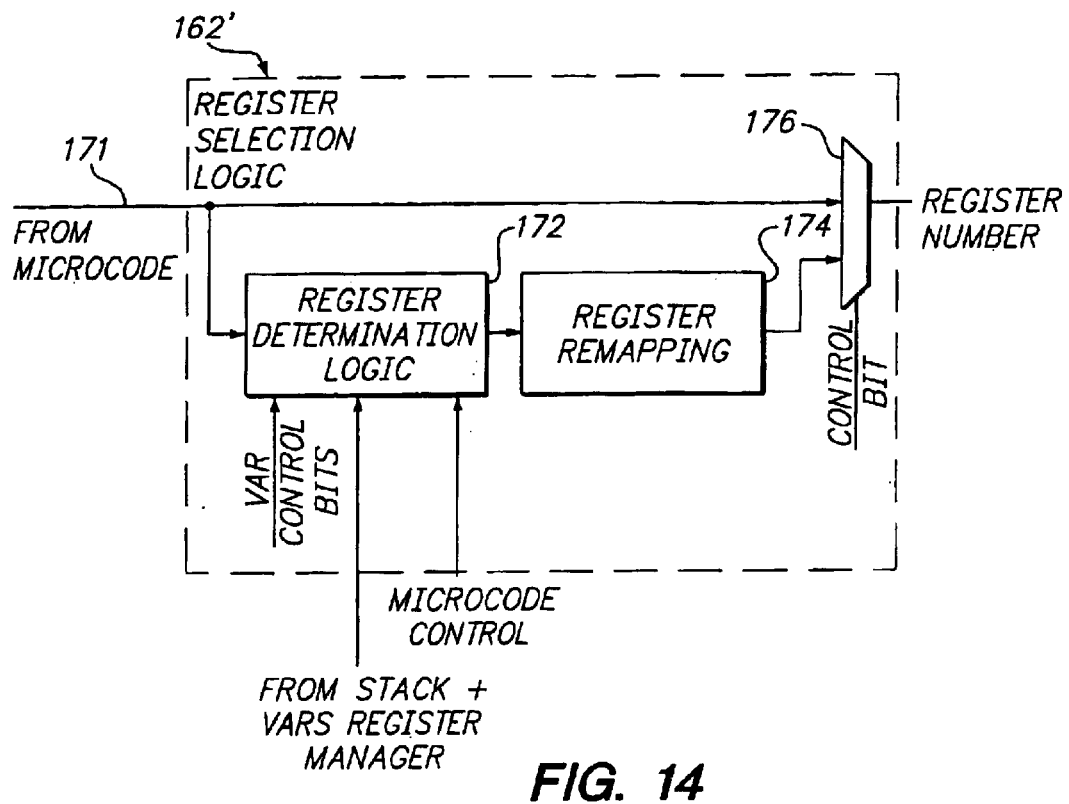
FIG. 14 is a diagram of a register selection logic used with the native instruction composer unit of FIG. 13.

FIG. 14 shows the register selection logic 161' of one embodiment of the present invention. The register determination logic 172 determines from the variable control bits, the microcode control bits and the Stack and Vars register manager information which register to use. For example, if the instruction is to load the top of stack and then use this top of stack value in next bytecode register determination logic 172 can be used to determine that register R10 contains the top of stack value and so Register R10 is used in the converted instruction.

Register remapping unit 174 does register remapping. In conventional CPUs, some registers are reserved. Register remapping unit 174 allows the decoder logic to assume that the Stack and Var registers are virtual, which simplifies the calculations. Multiplexer 176 allows the value on line 171 to be passed without being modified.

Figure 15:
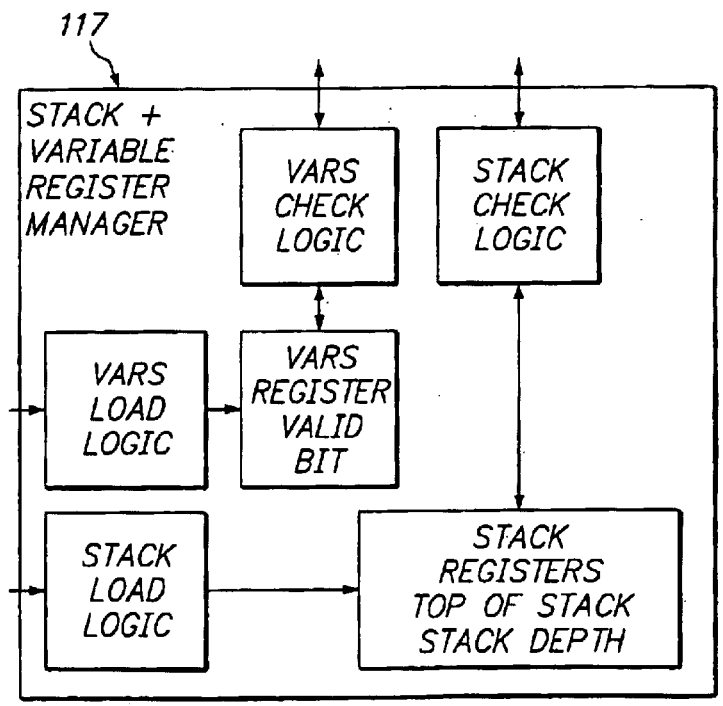
FIG. 15 illustrates a stack-and-variable-register manager of one embodiment of the present invention.

FIG. 15 illustrates an embodiment of a stack-and-variable-register manager 114'. The stack-and-variable-register manager maintains indications of what is stored in the variable and stack registers of the register file of the CPU. This information is then provided to the decode stage and microcode stage in order to help in the decoding of the Java™ bytecode and generating appropriate native instructions.

In a preferred embodiment, one of the functions of the Stack-and-Var register manager is to maintain an indication of the top of the stack. Thus, if for example registers R1–R4 store the top 4 stack values from memory or by executing byte codes, the top of the stack will change as data is loaded into and out of the register file. Thus, register R2 can be the top of the stack and register R1 be the bottom of the stack in the register file. When a new data is loaded into the stack within the register file, the data will be loaded into register R3, which then becomes the new top of the stack, the bottom of the stack remains R1. With two more items loaded on the stack in the register file, the new top of stack in the register file will be R1 but first R1 will be written back to memory by the accelerators overfiow/underlfow unit, and R2 will be the bottom of the partial stack in the CPU register file.

Figure 16:
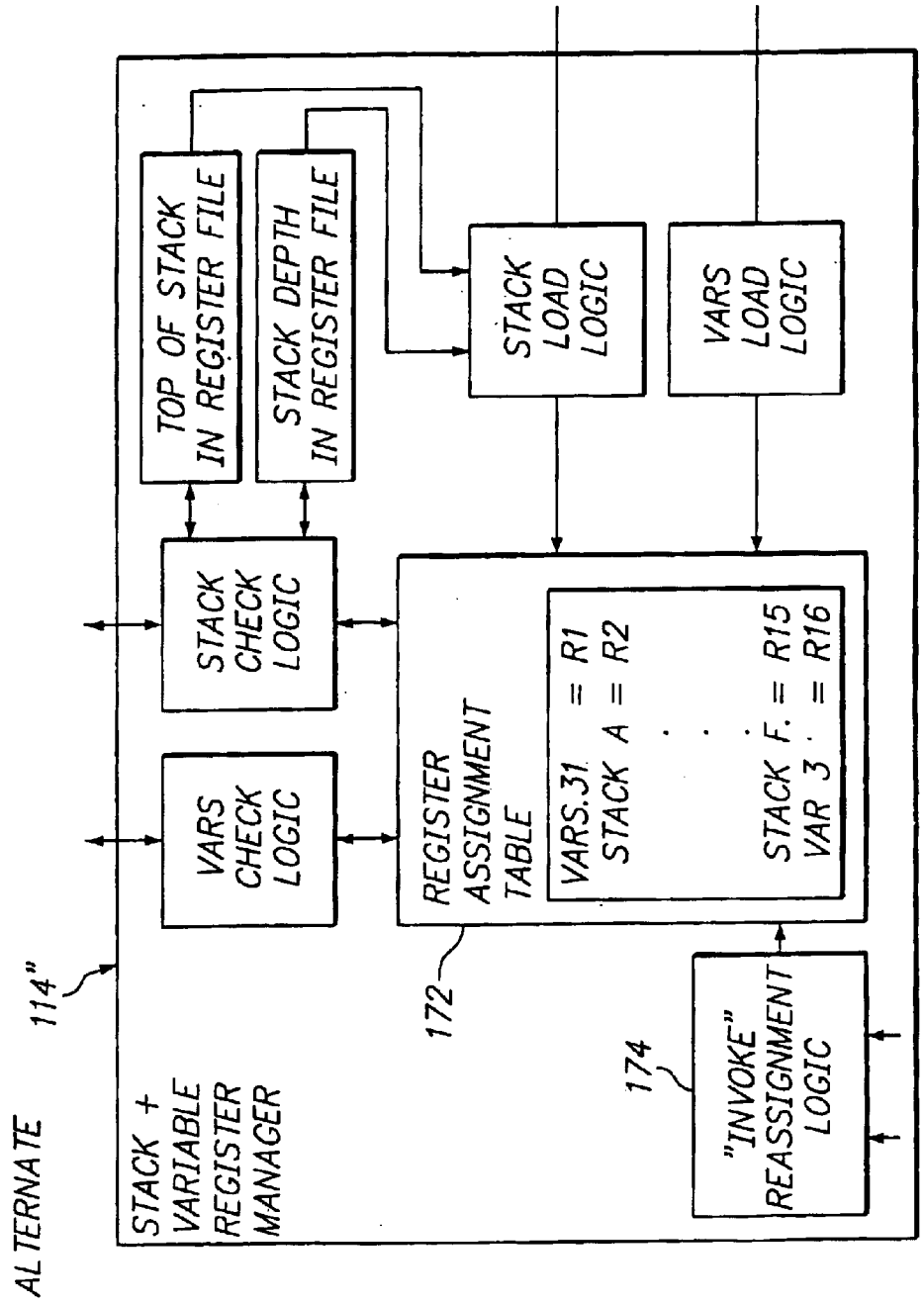
FIG. 16 illustrates a stack-and-variable-register manager of an alternate embodiment of the present invention.

FIG. 16 illustrates an alternate stack-and-variable-register manager 114". In this alternate embodiment, a register assignment table 172 is maintained. The register assignment table maintains an indication of which Vars and stack variables are stored in which registers. When an instruction is decoded it is checked whether a Var or stack value is stored in the register file using the register assignment table 172. If there is a match to the incoming stack or Var value, the values within the register file of the CPU are used. If there is no match, the value can be loaded into the register file from the memory and the register assignment table updated. In one embodiment, an invoke assignment logic unit 174 is operably conected with the register assignment table. When an invoke occurs, typically the values of some of the stack and the Vars are switched. By reassigning the values within the register assignment table 172 using reassignment logic 174, the operation of the invoke can be speeded up.

Figure 17:
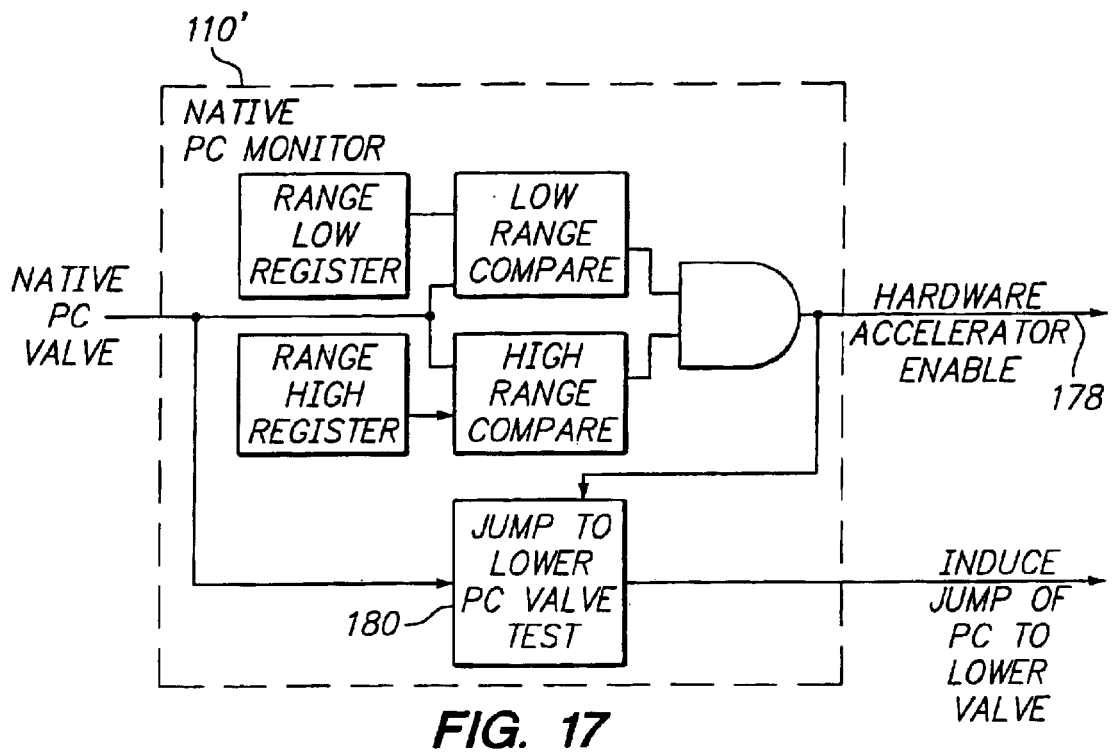
FIG. 17 is a diagram of the native PC monitor used with one embodiment of the present invention.

FIG. 17 shows one embodiment of a native PC monitor 110'. The native PC value is compared to a high range register and a low range register. If the native PC value is within this range, the hardware accelerator is enabled using line 178. Otherwise the hardware accelerator is disabled. The element 180 tests whether the native PC value is coming close to the high end of the spoof range. If so, the system induces a jump to a lower value of the native PC unit.

Figure 18:
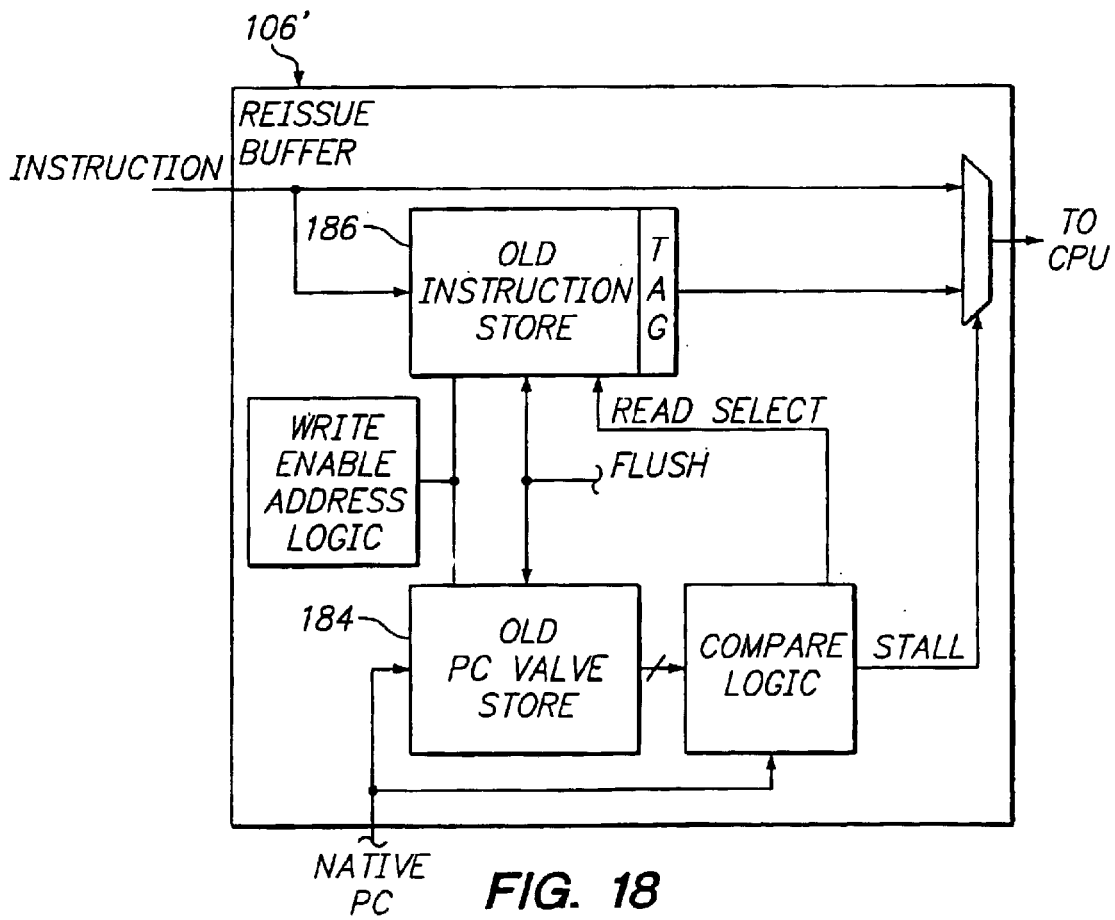
FIG. 18 is a diagram of a reissue buffer used with one embodiment of the present invention.

FIG. 18 illustrates an embodiment of a reissue buffer 106'. The reissue buffer receives the converted instructions and stores them along with the associated native PC value. As long as there is no interrupt, the native PC value will continue to increment, and the next instruction and current native PC is stored in the reissue buffer and instruction issued to the CPU. When an interrupt occurs, the CPU pipeline is flushed, including non-executed instructions, of which there is a copy in the reissue buffer. When a return from an interrupt occurs, the CPU is flushed and the native PC value before the interrupt is restored. This restored native PC value matches a native PC stored in the PC value store 184, causing a buffered instruction in the old instruction store 186 to be provided to the CPU. The old instruction store and the PC value store are synchronized. Once all of the old instructions are provided to the CPU 102, the native PC value will be outside of the range of all of the old PC values in store 184, and new converted instructions will be provided. The depth of the reissue buffer depends upon the number of pipeline stages in the CPU 102 (not shown). Under certain conditions such as branches, the reissue buffer is flushed. As described above, the reissue buffer eases the operation of the hardware accelerator. The hardware accelerator need not know the details of the return from interrupt operation of the CPU. Thus the hardware accelerator can operate with a variety of different CPUs without requiring major modification of the hardware accelerator architecture. Changes to the microcode stage are sufficient to change the hardware accelerator so that it could be used with different CPUs.

Figure 19:
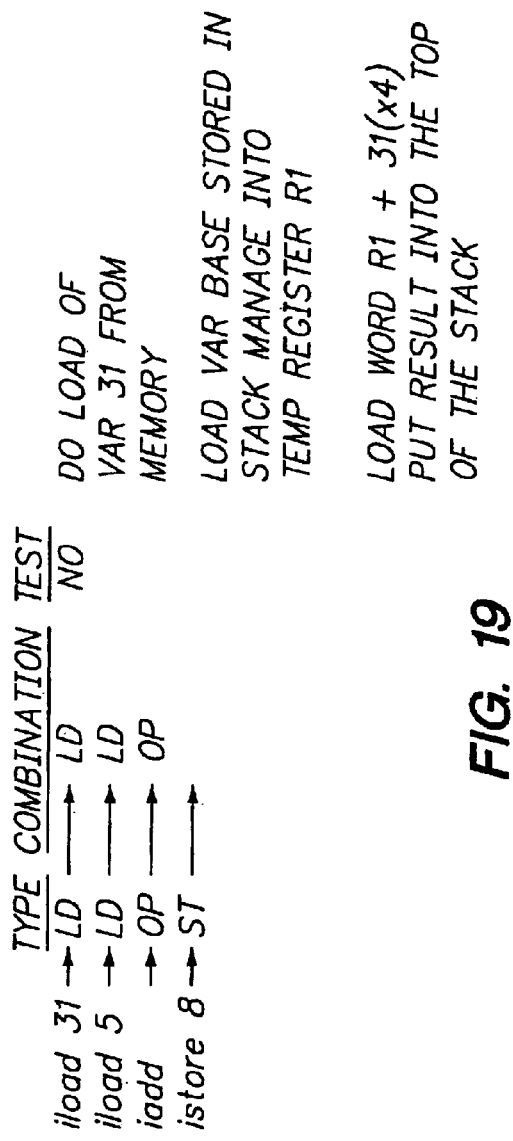
FIGS. 19 and 20 are diagrams that illustrate the operation of one embodiment of the present invention.
Figure 20:
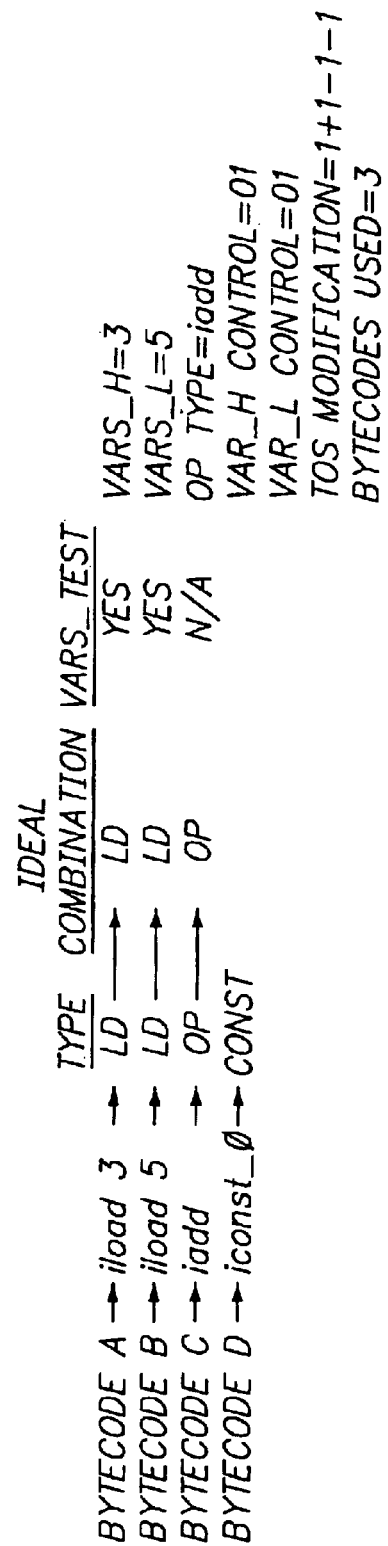

FIGS. 19 and 20 illustrate the operation of one embodiment of the system of the present invention. In FIG. 19, multiple instructions are shown being received by the decoder stage. The top two instructions are integer loads and the bottom instruction is an integer add. The ideal combination of these bytecodes by the system would be the main op code being an add and the two loads combined together. The system tests whether each of the Vars is in memory. In this example, the iload 31 is not a Var which is stored in memory. Thus the value of the Var 31 needs to be loaded from memory into a free register. In this example, the Var base stored in the stack manager is loaded into temp register R10. The word is put into the top of the stack, or in this case in the register file indicating the top of the stack.

FIG. 20 illustrates an example when iload_3 and iload 5 are used. In this example, both of these Vars are stored within the register file. Thus, the add can be combined with the two loads. In this example, Var H is indicated as being a 3, Var L is indicated as being a 5. The op type is indicated as being iadd. The Var H Control and Var L Control indicate that the Vars are load types and in the register file. The top of the stack modification is +1. This is because two values are loaded upon the stack for the two loads, and one value is removed from the stack as a result of the main add operation.

In actuality, as can be understood with respect to the figures described above, the Var 3 and Var 5 are already stored within the two register files. The value of these register files is determined by the system. The instructions iload 3, iload 5 and iadd are done by determining which two registers store Var 3 and Var S and also determining which register is to store the new top of the stack. If Var 3 is stored in register R9 and Var 5 is stored in register R11 and the top of the stack is to be stored in register R2, the converted native instruction is an add of the value within register R9 to the value within register R11 and store the value into register R2. This native instruction thus does the operation of three bytecodes at the same time, resulting in the instruction level parellelism as operated on a native CPU.

Additionally within the hardware accelerator a ALU is deployed where the decoded byte code instructions for bytecodes such as GOTO and GOTO_W, the immediate branch offset following the bytecode instruction is sign extended and added to the Java™ PC of the current bytecode instruction and the result is stored in the Java™ PC register. JSR and JSR_W bytecode instructions also do this in addition to pushing the Java™ PC of the next byte code instruction on the operand stack.

The Java™ PC is incremented by a value calculated by the hardware accelerator. This increment value is based on the number of bytes being disposed of during the current decode which may include more than one byte code due to ILP. Similarly, SiPush and BiPush instructions are also sign extended and made available in the immediate field of the native instruction being composed. In some processors, the immediate field of the native instruction has a smaller bit width than is desired for the offsets or sign extended constants so this data may be read as memory mapped or I/O mapped reads.

While the present invention has been described with reference to the above embodiments, this description of the preferred embodiments and methods is not meant to be construed in a limiting sense. For example, the term Java™ in the specification or claims should be construed to cover successor programming languages or other programming languages using basic Java™ concepts (the use of generic instructions, such as bytecodes, to indicate the operation of a virtual machine). It should also be understood that all aspects of the present invention are not to be limited to the specific descriptions, or to configurations set forth herein. Some modifications in form and detail the various embodiments of the disclosed invention, as well as other variations in the present invention, will be apparent to a person skilled in the art upon reference to the present disclosure. It is therefore contemplated that the following claims will cover any such modifications or variations of the described embodiment as falling within the true spirit and scope of the present invention.

What is claimed is:

1. A CPU for executing stack and register-based instructions, comprising:

execute logic for executing the register-based instructions;

a register file associated with the executed logic; and a hardware accelerator to process stack-based instructions in cooperation with the execute logic, wherein the hardware accelerator generates a new virtual machine program counter (PC) due to a "jump subroutine JSR" or "jump subroutine wide JSR_W" bytecode by sign extending the immediate branch offset following the "jump subrountine JSR" or "jump subroutine wide JSR_W" byte code and adding it to the virtual machine (PC) of the current byte code instruction, computes the return virtual machine program counter and pushes the return virtual machine program counter 2. A central processing unit (CPU) for executing stack and register-based instructions, comprising:

execute logic for executing the register-based instructions;

a register file associated with the execute logic; and a hardware accelerator to process stack-based instructions in cooperation with the execute logic, wherein the hardware accelerator:

maintains an operand stack for the stack-based instructions in the register file such that the operand stack in the register file define a ring buffer in conjunction with an overflow/underflow mechanism for moving operands in the operand stack between the register file and a memory, and loads variables required for processing the stack-based instructions into the register file, generates a new virtual machine program counter due to a "GOTO" or "GOTO_W" byte code by sign extending the immediate branch offset following the "GOTO" or "GOTO_W" bytecode and adds it to the virtual machine program counter of the current bytecode instruction, generates a new virtual machine program counter due to a "JSR" or "JSR_W" bytecode by sign extending the immediate branch offset following the "JSR" or "JSR_W" bytecode and adding it to the virtual machine PC of the current byte code instruction, computes the return virtual machine program counter and pushes the return virtual machine program counter onto the operand stack, performs a sign extension for the virtual machine SiPush and BiPush byte codes and appends the sign extended data to the immediate field of a register-based instruction being composed based the stack-based instructions;

performs sign extension for virtual machine SiPush and BiPush bytecodes and makes the sign extended data available to be read by the execute logic; and produces exceptions in respect of selected stack-based instructions.

3. The CPU of claim 2, wherein the exceptions are processed using register-based instructions.

4. The CPU of claim 2, wherein the hardware accelerator processes the stack-based instructions in cooperation with the execute logic by converting the stack-based instructions into register-based instructions for execution in the execute logic.

5. A central processing unit (CPU) comprising:

execute logic to receive and process input corresponding to register-based instruction;

a hardware accelerator to process stack-based instructions to produce an output that can be processed by the execute logic;

an operand stack for the stack-based instructions, the operand stack being maintained in a register file as a ring buffer;

an overflow/underflow mechanism for moving operands in the operand stack between a register file and a memory, said register file also storing data associated with the register-based instructions;

a bytecode buffer that receives stack-based instructions from the memory; and an instruction decode unit coupled to the bytecode buffer to decode instructions received from the bytecode buffer and to provide an indication of how many bytes have been processed; and a common program counter for the stack-based instructions and the register-based instructions, wherein the common program counter is incremented by the indication of the number of bytes processed.

6. The CPU of claim 5, further comprising a common instruction cache for the stack-based instructions and the register-based instructions.

7. The CPU of claim 5, wherein the instruction decode unit produces an indication for a variable stored in the register file.

8. The CPU of claim 5, further comprising a microcode unit coupled to the instruction decode unit to receive output therefrom.

9. The CPU of claim 8, wherein the instruction decode unit generates a start address for the microcode unit.

10. The CPU of claim 9, further comprising a mechanism to select the start address or an incremented start address for the microcode unit.

11. The CPU of claim 9, wherein the microcode unit produces a stack update indication to cause the instruction decode unit to generate a new start address for the microcode unit.

12. The CPU of claim 5, wherein the hardware accelerator produces an exception in respect of selected stack-based instructions.

13. The CPU of claim 12, wherein the exception is processed using register based instructions.

14. The CPU of claim 5, wherein the instruciton decode unit decodes multiple instructions received from the bytecode buffer in parallel.

15. The CPU of claim 14, wherein the instruction decode unit comprises multiple decoders.

16. A method for a central processing unit (CPU), comprising:

for register-based instructions, processing the register-based instructions in execute logic capable of processing the register-based instructions; and for stack-based instructions, processing the stack-based instructions in a hardware accelerator into input the execute logic is capable of processing, wherein the hardware accelerator generates a new virtual machine program counter (PC) due to a "jump subroutine JSR" or "jump subroutine wide JSR_W" bytecode by sign extending an immediate branch offset following the "JSR" or "JSR_W" bytecode and adding it to a virtual machine program counter (PC) of a current bytecode instruction, computes a return virtual machine program counter (PC) and pushes the return virtual machine program counter onto an operand stack.

17. The method of claim 16, wherein processing the stack-based instructions comprises decoding multiple stack-based instructions in an instruction decode unit in parallel.

18. The method of claim 17, wherein processing the stack-based instructions comprises generating a start address for a microcode unit in the instruction deccode unit.

19. The method of claim 18, processing the stack-based instructions comprises selecting the start address or an incremented start address for the microcode unit.

20. The method of claim 16, wherein processing the stack-based instructions comprises generating exceptions in respect of selected stack-based instructions.

21. The method of claim 16, further comprising storing the storing the stack-based instructions and the register-based instructions in a common instruction cache.

22. The method of claim 16, wherein processing the stack-based instructions comprises producing an indication for a variable stored in a register file.

* * * * *